United States Patent
Sundaram et al.

(10) Patent No.: US 10,805,769 B2
(45) Date of Patent: *Oct. 13, 2020

(54) SYSTEMS AND METHODS OF DEPLOYING LOCATION TRACKING TAGS

(71) Applicant: SYMBOL TECHNOLOGIES, LLC, Lincolnshire, IL (US)

(72) Inventors: Sundaresan Sundaram, Bangalore (IN); Varun Tandon, Bangalore (IN); Suman Chandra, Bangalore (IN)

(73) Assignee: Symbol Technologies, LLC, Holtsville, NY (US)

( * ) Notice: Subject to any disclaimer, the term of this patent is extended or adjusted under 35 U.S.C. 154(b) by 6 days.

This patent is subject to a terminal disclaimer.

(21) Appl. No.: 16/163,302

(22) Filed: Oct. 17, 2018

(65) Prior Publication Data

US 2019/0053020 A1  Feb. 14, 2019

Related U.S. Application Data

(63) Continuation of application No. 15/218,721, filed on Jul. 25, 2016, now Pat. No. 10,142,797.

(51) Int. Cl.
| | |
|---|---|
| *H04W 24/00* | (2009.01) |
| *H04W 4/029* | (2018.01) |
| *H04W 4/06* | (2009.01) |
| *H04W 64/00* | (2009.01) |
| *G01S 5/02* | (2010.01) |
| *H04W 4/80* | (2018.01) |
| *G01S 5/00* | (2006.01) |
| *H04W 4/30* | (2018.01) |

(52) U.S. Cl.
CPC ........... *H04W 4/029* (2018.02); *G01S 5/0045* (2013.01); *G01S 5/0242* (2013.01); *G01S 5/0252* (2013.01); *G01S 5/0294* (2013.01); *H04W 4/06* (2013.01); *H04W 4/30* (2018.02); *H04W 4/80* (2018.02); *H04W 64/00* (2013.01)

(58) Field of Classification Search
CPC ................................................. H04W 52/0225
USPC ........... 455/456.1, 11.1, 561, 556.1, 401, 46, 455/67.11, 509, 73; 370/330, 228, 389
See application file for complete search history.

(56) References Cited

U.S. PATENT DOCUMENTS

| | | | |
|---|---|---|---|
| 7,504,952 B2 | 3/2009 | Kaplan et al. | |
| 7,511,604 B2 | 3/2009 | Raphaeli et al. | |
| 7,714,698 B2 | 5/2010 | Kaplan et al. | |
| 7,733,218 B2 | 6/2010 | Drago et al. | |
| 7,756,230 B2 | 7/2010 | Raphaeli et al. | |
| 8,169,319 B2 | 5/2012 | Kaplan et al. | |
| 8,174,365 B2 * | 5/2012 | Akiyama | H04B 5/0056 340/10.1 |
| 8,193,913 B2 | 6/2012 | Raphaeli et al. | |
| 8,422,398 B2 | 4/2013 | Ripstein et al. | |
| 8,427,242 B2 | 4/2013 | Raphaeli et al. | |

(Continued)

*Primary Examiner* — Joseph Arevalo

(57) ABSTRACT

A tag having a fixed physical location comprising a processor, a memory storing a first identifier, and a wireless communication interface configured to broadcast a first transmission including the first identifier. The processor is configured to receive, from the wireless communication interface, second identifiers of neighboring tags. The processor then configured to store the second identifiers of the neighboring tags in the memory and then modify the first transmission of the first identifier to include the second identifiers of the neighboring tags.

13 Claims, 26 Drawing Sheets

| TAG IDENTIFIER | LOCATION | NEIGHBOURING TAG IDENTIFIERS |
|---|---|---|
| .... | .... | .... |
| $T_{18}$ | UNKNOWN | $T_{17}$ $T_{27}$ $T_{28}$ |
| $T_{21}$ | UNKNOWN | $T_{11}$ $T_{12}$ $T_{22}$ $T_{31}$ $T_{32}$ |
| $T_{22}$ | UNKNOWN | $T_{11}$ $T_{12}$ $T_{13}$ $T_{21}$ $T_{23}$ $T_{31}$ $T_{32}$ $T_{33}$ |
| $T_{23}$ | UNKNOWN | $T_{12}$ $T_{13}$ $T_{14}$ $T_{22}$ $T_{24}$ $T_{32}$ $T_{33}$ $T_{34}$ |
| $T_{24}$ | L 12 | $T_{13}$ $T_{14}$ $T_{15}$ $T_{23}$ $T_{25}$ $T_{33}$ $T_{34}$ $T_{35}$ |
| $T_{25}$ | UNKNOWN | $T_{14}$ $T_{15}$ $T_{16}$ $T_{24}$ $T_{26}$ $T_{34}$ $T_{35}$ $T_{36}$ |
| $T_{26}$ | UNKNOWN | $T_{15}$ $T_{16}$ $T_{17}$ $T_{25}$ $T_{27}$ $T_{35}$ $T_{36}$ $T_{37}$ |
| $T_{27}$ | UNKNOWN | $T_{16}$ $T_{17}$ $T_{18}$ $T_{26}$ $T_{28}$ $T_{36}$ $T_{37}$ $T_{38}$ |
| $T_{28}$ | UNKNOWN | $T_{17}$ $T_{18}$ $T_{27}$ $T_{37}$ $T_{38}$ |
| $T_{31}$ | UNKNOWN | $T_{21}$ $T_{22}$ $T_{32}$ $T_{41}$ $T_{42}$ |
| $T_{32}$ | UNKNOWN | $T_{21}$ $T_{22}$ $T_{23}$ $T_{31}$ $T_{33}$ $T_{41}$ $T_{42}$ $T_{43}$ |
| $T_{33}$ | L 19 | $T_{22}$ $T_{23}$ $T_{24}$ $T_{32}$ $T_{34}$ $T_{42}$ $T_{43}$ $T_{44}$ |
| $T_{34}$ | L 20 | $T_{23}$ $T_{24}$ $T_{25}$ $T_{33}$ $T_{35}$ $T_{43}$ $T_{44}$ $T_{45}$ |
| $T_{35}$ | L 21 | $T_{24}$ $T_{25}$ $T_{26}$ $T_{34}$ $T_{36}$ $T_{44}$ $T_{45}$ $T_{46}$ |
| $T_{36}$ | UNKNOWN | $T_{25}$ $T_{26}$ $T_{27}$ $T_{35}$ $T_{37}$ $T_{45}$ $T_{46}$ $T_{47}$ |
| $T_{37}$ | UNKNOWN | $T_{26}$ $T_{27}$ $T_{28}$ $T_{36}$ $T_{38}$ $T_{46}$ $T_{47}$ $T_{48}$ |
| $T_{38}$ | UNKNOWN | $T_{27}$ $T_{28}$ $T_{37}$ $T_{47}$ $T_{48}$ |
| $T_{41}$ | UNKNOWN | $T_{31}$ $T_{32}$ $T_{42}$ $T_{51}$ $T_{52}$ |
| $T_{42}$ | UNKNOWN | $T_{31}$ $T_{32}$ $T_{33}$ $T_{41}$ $T_{43}$ $T_{51}$ $T_{52}$ $T_{53}$ |
| $T_{43}$ | UNKNOWN | $T_{32}$ $T_{33}$ $T_{34}$ $T_{42}$ $T_{44}$ $T_{52}$ $T_{53}$ $T_{54}$ |
| $T_{44}$ | L 28 | $T_{33}$ $T_{34}$ $T_{35}$ $T_{43}$ $T_{45}$ $T_{53}$ $T_{54}$ $T_{55}$ |
| $T_{45}$ | UNKNOWN | $T_{34}$ $T_{35}$ $T_{36}$ $T_{44}$ $T_{46}$ $T_{54}$ $T_{55}$ $T_{56}$ |
| $T_{46}$ | UNKNOWN | $T_{35}$ $T_{36}$ $T_{37}$ $T_{45}$ $T_{47}$ $T_{55}$ $T_{56}$ $T_{57}$ |
| $T_{47}$ | UNKNOWN | $T_{36}$ $T_{37}$ $T_{38}$ $T_{46}$ $T_{48}$ $T_{56}$ $T_{57}$ $T_{58}$ |
| .... | .... | .... |

250

(56) References Cited

U.S. PATENT DOCUMENTS

| | | |
|---|---|---|
| 8,786,495 B2 | 7/2014 | Wisherd et al. |
| 8,890,677 B2 | 11/2014 | Raphaeli |
| 8,896,421 B2 | 11/2014 | Kaplan |
| 9,307,554 B2 | 4/2016 | Raphaeli et al. |
| 2006/0103534 A1 | 5/2006 | Arms et al. |
| 2007/0256050 A1* | 11/2007 | Behnia ............... G06F 8/71 717/104 |
| 2009/0192950 A1 | 7/2009 | Ing et al. |
| 2010/0067420 A1 | 3/2010 | Twitchell, Jr. et al. |
| 2010/0248768 A1* | 9/2010 | Nakatsugawa ... H04W 52/0225 455/509 |
| 2011/0099038 A1* | 4/2011 | Nishida ............... G06Q 10/02 705/5 |
| 2011/0211563 A1* | 9/2011 | Herrala ............... H04W 4/029 370/338 |
| 2014/0361906 A1 | 12/2014 | Ughes et al. |
| 2016/0283699 A1* | 9/2016 | Levin ............... G06F 21/44 |
| 2017/0053229 A1* | 2/2017 | Folino ............... G06Q 10/087 |

* cited by examiner

| TAG IDENTIFIER | LOCATION | NEIGHBOURING TAG IDENTIFIERS |
|---|---|---|
| .... | .... | .... |
| $T_{18}$ | UNKNOWN | $T_{17}$ $T'_{27}$ $T_{28}$ |
| $T_{21}$ | UNKNOWN | $T_{11}$ $T'_{12}$ $T_{22}$ $T_{31}$ $T'_{32}$ |
| $T_{22}$ | UNKNOWN | $T'_{11}$ $T_{12}$ $T'_{13}$ $T_{21}$ $T_{23}$ $T'_{31}$ $T_{32}$ $T'_{33}$ |
| $T_{23}$ | UNKNOWN | $T'_{12}$ $T_{13}$ $T'_{14}$ $T_{22}$ $T_{24}$ $T'_{32}$ $T_{33}$ $T'_{34}$ |
| $T_{24}$ | UNKNOWN | $T'_{13}$ $T_{14}$ $T'_{15}$ $T_{23}$ $T_{25}$ $T'_{33}$ $T_{34}$ $T'_{35}$ |
| $T_{25}$ | UNKNOWN | $T'_{14}$ $T_{15}$ $T'_{16}$ $T_{24}$ $T_{26}$ $T'_{34}$ $T_{35}$ $T'_{36}$ |
| $T_{26}$ | UNKNOWN | $T'_{15}$ $T_{16}$ $T'_{17}$ $T_{25}$ $T_{27}$ $T'_{35}$ $T_{36}$ $T'_{37}$ |
| $T_{27}$ | UNKNOWN | $T'_{16}$ $T_{17}$ $T'_{18}$ $T_{26}$ $T_{28}$ $T'_{38}$ $T_{37}$ $T'_{38}$ |
| $T_{28}$ | UNKNOWN | $T'_{17}$ $T_{18}$ $T_{27}$ $T'_{37}$ $T_{38}$ |
| $T_{31}$ | UNKNOWN | $T_{21}$ $T'_{22}$ $T_{32}$ $T_{41}$ $T'_{42}$ |
| $T_{32}$ | UNKNOWN | $T'_{21}$ $T_{22}$ $T'_{23}$ $T_{31}$ $T_{33}$ $T'_{41}$ $T_{42}$ $T'_{43}$ |
| $T_{33}$ | UNKNOWN | $T'_{22}$ $T_{23}$ $T'_{24}$ $T_{32}$ $T_{34}$ $T'_{42}$ $T_{43}$ $T'_{44}$ |
| $T_{34}$ | UNKNOWN | $T'_{23}$ $T_{24}$ $T'_{25}$ $T_{33}$ $T_{35}$ $T'_{43}$ $T_{44}$ $T'_{45}$ |
| $T_{35}$ | UNKNOWN | $T'_{24}$ $T'_{25}$ $T_{26}$ $T_{34}$ $T_{36}$ $T'_{44}$ $T_{45}$ $T'_{46}$ |
| $T_{36}$ | UNKNOWN | $T'_{25}$ $T_{26}$ $T'_{27}$ $T_{36}$ $T_{37}$ $T'_{45}$ $T_{46}$ $T'_{47}$ |
| $T_{37}$ | UNKNOWN | $T'_{26}$ $T_{27}$ $T'_{28}$ $T_{36}$ $T_{38}$ $T'_{46}$ $T_{47}$ $T'_{48}$ |
| $T_{38}$ | UNKNOWN | $T'_{27}$ $T_{28}$ $T_{37}$ $T'_{47}$ $T_{48}$ |
| $T_{41}$ | UNKNOWN | $T_{31}$ $T'_{32}$ $T_{42}$ $T_{51}$ $T'_{52}$ |
| $T_{42}$ | UNKNOWN | $T'_{31}$ $T_{32}$ $T'_{33}$ $T_{41}$ $T_{43}$ $T'_{51}$ $T_{52}$ $T'_{53}$ |
| $T_{43}$ | UNKNOWN | $T'_{32}$ $T_{33}$ $T'_{34}$ $T_{42}$ $T_{44}$ $T'_{52}$ $T_{53}$ $T'_{54}$ |
| $T_{44}$ | UNKNOWN | $T'_{33}$ $T_{34}$ $T'_{35}$ $T_{43}$ $T_{45}$ $T'_{53}$ $T_{54}$ $T'_{55}$ |
| $T_{45}$ | UNKNOWN | $T'_{34}$ $T_{35}$ $T'_{36}$ $T_{44}$ $T_{46}$ $T'_{54}$ $T_{55}$ $T'_{56}$ |
| $T_{46}$ | UNKNOWN | $T'_{35}$ $T_{36}$ $T'_{37}$ $T_{45}$ $T_{47}$ $T'_{55}$ $T_{56}$ $T'_{57}$ |
| $T_{47}$ | UNKNOWN | $T'_{36}$ $T_{37}$ $T'_{38}$ $T_{46}$ $T_{48}$ $T'_{56}$ $T_{57}$ $T'_{58}$ |
| .... | .... | .... |

| L1 | L2 | L3 | L4 | L5 | L6 | L7 | L8 |
|----|----|----|----|----|----|----|----|
| L9 | L10 | L11 | L12 | L13 | L14 | L15 | L16 |
| L17 | L18 | L19 | L20 | L21 | L22 | L23 | L24 |
| L25 | L26 | L27 | L28 | L29 | L30 | L31 | L32 |
| L33 | L34 | L35 | L36 | L37 | L38 | L39 | L40 |

FIG. 11

| TAG IDENTIFIER | LOCATION | NEIGHBOURING TAG IDENTIFIERS |
|---|---|---|
| .... | .... | .... |
| $T_{18}$ | UNKNOWN | $T_{17}$ $T'_{27}$ $T_{28}$ |
| $T_{21}$ | UNKNOWN | $T_{11}$ $T'_{12}$ $T_{22}$ $T_{31}$ $T'_{32}$ |
| $T_{22}$ | UNKNOWN | $T'_{11}$ $T_{12}$ $T'_{13}$ $T_{21}$ $T_{23}$ $T'_{31}$ $T_{32}$ $T'_{33}$ |
| $T_{23}$ | UNKNOWN | $T'_{12}$ $T_{13}$ $T'_{14}$ $T_{22}$ $T_{24}$ $T'_{32}$ $T_{33}$ $T'_{34}$ |
| $T_{24}$ | L 12 | $T'_{13}$ $T_{14}$ $T'_{15}$ $T_{23}$ $T_{25}$ $T'_{33}$ $T_{34}$ $T'_{35}$ |
| $T_{25}$ | UNKNOWN | $T'_{14}$ $T_{15}$ $T'_{16}$ $T_{24}$ $T_{26}$ $T'_{34}$ $T_{35}$ $T'_{36}$ |
| $T_{26}$ | UNKNOWN | $T'_{15}$ $T_{16}$ $T'_{17}$ $T_{25}$ $T_{27}$ $T'_{35}$ $T_{36}$ $T'_{37}$ |
| $T_{27}$ | UNKNOWN | $T'_{16}$ $T_{17}$ $T'_{18}$ $T_{26}$ $T_{28}$ $T'_{38}$ $T_{37}$ $T'_{38}$ |
| $T_{28}$ | UNKNOWN | $T'_{17}$ $T_{18}$ $T'_{27}$ $T'_{37}$ $T_{38}$ |
| $T_{31}$ | UNKNOWN | $T_{21}$ $T'_{22}$ $T_{32}$ $T_{41}$ $T'_{42}$ |
| $T_{32}$ | UNKNOWN | $T'_{21}$ $T_{22}$ $T'_{23}$ $T_{31}$ $T_{33}$ $T'_{41}$ $T_{42}$ $T'_{43}$ |
| $T_{33}$ | L 19 | $T'_{22}$ $T_{23}$ $T'_{24}$ $T_{32}$ $T_{34}$ $T'_{42}$ $T_{43}$ $T'_{44}$ |
| $T_{34}$ | L 20 | $T'_{23}$ $T_{24}$ $T'_{25}$ $T_{33}$ $T_{35}$ $T'_{43}$ $T_{44}$ $T'_{45}$ |
| $T_{35}$ | L 21 | $T'_{24}$ $T_{25}$ $T'_{26}$ $T_{34}$ $T_{36}$ $T'_{44}$ $T_{45}$ $T'_{46}$ |
| $T_{36}$ | UNKNOWN | $T'_{25}$ $T_{26}$ $T'_{27}$ $T_{36}$ $T_{37}$ $T'_{45}$ $T_{46}$ $T'_{47}$ |
| $T_{37}$ | UNKNOWN | $T'_{26}$ $T_{27}$ $T'_{28}$ $T_{36}$ $T_{38}$ $T'_{46}$ $T_{47}$ $T'_{48}$ |
| $T_{38}$ | UNKNOWN | $T'_{27}$ $T_{28}$ $T_{37}$ $T'_{47}$ $T_{48}$ |
| $T_{41}$ | UNKNOWN | $T_{31}$ $T'_{32}$ $T_{42}$ $T_{51}$ $T'_{52}$ |
| $T_{42}$ | UNKNOWN | $T'_{31}$ $T_{32}$ $T'_{33}$ $T_{41}$ $T_{43}$ $T'_{51}$ $T_{52}$ $T'_{53}$ |
| $T_{43}$ | UNKNOWN | $T'_{32}$ $T_{33}$ $T'_{34}$ $T_{42}$ $T_{44}$ $T'_{52}$ $T_{53}$ $T'_{54}$ |
| $T_{44}$ | L 28 | $T'_{33}$ $T_{34}$ $T'_{35}$ $T_{43}$ $T_{45}$ $T'_{53}$ $T_{54}$ $T'_{55}$ |
| $T_{45}$ | UNKNOWN | $T'_{34}$ $T_{35}$ $T'_{36}$ $T_{44}$ $T_{46}$ $T'_{54}$ $T_{55}$ $T'_{56}$ |
| $T_{46}$ | UNKNOWN | $T'_{35}$ $T_{36}$ $T'_{37}$ $T_{45}$ $T_{47}$ $T'_{55}$ $T_{56}$ $T'_{57}$ |
| $T_{47}$ | UNKNOWN | $T'_{36}$ $T_{37}$ $T'_{38}$ $T_{46}$ $T_{48}$ $T'_{56}$ $T_{57}$ $T'_{58}$ |
| .... | .... | .... |

| L1 | L2 | L3 | L4 | L5 | L6 | L7 | L8 |
|----|----|----|----|----|----|----|----|
| L9 | L10 | L11 | L12 $T_{24}$ | L13 | L14 | L15 | L16 |
| L17 | L18 | L19 $T_{33}$ | L20 $T_{34}$ | L21 $T_{35}$ | L22 | L23 | L24 |
| L25 | L26 | L27 | L28 $T_{44}$ | L29 | L30 | L31 | L32 |
| L33 | L34 | L35 | L36 | L37 | L38 | L39 | L40 |

FIG. 13

| TAG IDENTIFIER | LOCATION | NEIGHBOURING TAG IDENTIFIERS |
|---|---|---|
| .... | .... | .... |
| $T_{18}$ | UNKNOWN | $T_{17}$ $T'_{27}$ $T_{28}$ |
| $T_{21}$ | UNKNOWN | $T_{11}$ $T'_{12}$ $T_{22}$ $T_{31}$ $T'_{32}$ |
| $T_{22}$ | UNKNOWN | $T'_{11}$ $T_{12}$ $T'_{13}$ $T_{21}$ $T_{23}$ $T'_{31}$ $T_{32}$ $T'_{33}$ |
| $T_{23}$ | L 11 | $T'_{12}$ $T_{13}$ $T'_{14}$ $T_{22}$ $T_{24}$ $T'_{32}$ $T_{33}$ $T'_{34}$ |
| $T_{24}$ | L 12 | $T'_{13}$ $T_{14}$ $T'_{15}$ $T_{23}$ $T_{25}$ $T'_{33}$ $T_{34}$ $T'_{35}$ |
| $T_{25}$ | L 13 | $T'_{14}$ $T_{15}$ $T'_{16}$ $T_{24}$ $T_{26}$ $T'_{34}$ $T_{35}$ $T'_{36}$ |
| $T_{26}$ | UNKNOWN | $T'_{15}$ $T_{16}$ $T'_{17}$ $T_{25}$ $T_{27}$ $T'_{35}$ $T_{36}$ $T'_{37}$ |
| $T_{27}$ | UNKNOWN | $T'_{16}$ $T_{17}$ $T'_{18}$ $T_{26}$ $T_{28}$ $T'_{38}$ $T_{37}$ $T'_{38}$ |
| $T_{28}$ | UNKNOWN | $T'_{17}$ $T_{18}$ $T_{27}$ $T'_{37}$ $T_{38}$ |
| $T_{31}$ | UNKNOWN | $T_{21}$ $T'_{22}$ $T_{32}$ $T_{41}$ $T'_{42}$ |
| $T_{32}$ | UNKNOWN | $T'_{21}$ $T_{22}$ $T'_{23}$ $T_{31}$ $T_{33}$ $T'_{41}$ $T_{42}$ $T'_{43}$ |
| $T_{33}$ | L 19 | $T'_{22}$ $T_{23}$ $T'_{24}$ $T_{32}$ $T_{34}$ $T'_{42}$ $T_{43}$ $T'_{44}$ |
| $T_{34}$ | L 20 | $T'_{23}$ $T_{24}$ $T'_{25}$ $T_{33}$ $T_{35}$ $T'_{43}$ $T_{44}$ $T'_{45}$ |
| $T_{35}$ | L 21 | $T'_{24}$ $T_{25}$ $T'_{26}$ $T_{34}$ $T_{36}$ $T'_{44}$ $T_{45}$ $T'_{46}$ |
| $T_{36}$ | UNKNOWN | $T'_{25}$ $T_{26}$ $T'_{27}$ $T_{36}$ $T_{37}$ $T'_{45}$ $T_{46}$ $T'_{47}$ |
| $T_{37}$ | UNKNOWN | $T'_{26}$ $T_{27}$ $T'_{28}$ $T_{36}$ $T_{38}$ $T'_{46}$ $T_{47}$ $T'_{48}$ |
| $T_{38}$ | UNKNOWN | $T'_{27}$ $T_{28}$ $T_{37}$ $T'_{47}$ $T_{48}$ |
| $T_{41}$ | UNKNOWN | $T_{31}$ $T'_{32}$ $T_{42}$ $T_{51}$ $T'_{52}$ |
| $T_{42}$ | UNKNOWN | $T'_{31}$ $T_{32}$ $T'_{33}$ $T_{41}$ $T_{43}$ $T'_{51}$ $T_{52}$ $T'_{53}$ |
| $T_{43}$ | L 27 | $T'_{32}$ $T_{33}$ $T'_{34}$ $T_{42}$ $T_{44}$ $T'_{52}$ $T_{53}$ $T'_{54}$ |
| $T_{44}$ | L 28 | $T'_{33}$ $T_{34}$ $T'_{35}$ $T_{43}$ $T_{45}$ $T'_{53}$ $T_{54}$ $T'_{55}$ |
| $T_{45}$ | L 29 | $T'_{34}$ $T_{35}$ $T'_{36}$ $T_{44}$ $T_{46}$ $T'_{54}$ $T_{55}$ $T'_{56}$ |
| $T_{46}$ | UNKNOWN | $T'_{35}$ $T_{36}$ $T'_{37}$ $T_{45}$ $T_{47}$ $T'_{55}$ $T_{56}$ $T'_{57}$ |
| $T_{47}$ | UNKNOWN | $T'_{36}$ $T_{37}$ $T'_{38}$ $T_{46}$ $T_{48}$ $T'_{56}$ $T_{57}$ $T'_{58}$ |
| .... | .... | .... |

| L1 | L2 | L3 | L4 | L5 | L6 | L7 | L8 |
|---|---|---|---|---|---|---|---|
| L9 | L10 | L11 $T_{23}$ | L12 $T_{24}$ | L13 $T_{25}$ | L14 | L15 | L16 |
| L17 | L18 | L19 $T_{33}$ | L20 $T_{34}$ | L21 $T_{35}$ | L22 | L23 | L24 |
| L25 | L26 | L27 $T_{43}$ | L28 $T_{44}$ | L29 $T_{45}$ | L30 | L31 | L32 |
| L33 | L34 | L35 | L36 | L37 | L38 | L39 | L40 |

FIG. 15

| TAG IDENTIFIER | LOCATION | NEIGHBOURING TAG IDENTIFIERS |
|---|---|---|
| .... | .... | .... |
| $T_{18}$ | UNKNOWN | $T_{17}$ $T'_{27}$ $T_{28}$ |
| $T_{21}$ | UNKNOWN | $T_{11}$ $T'_{12}$ $T_{22}$ $T_{31}$ $T'_{32}$ |
| $T_{22}$ | UNKNOWN | $T'_{11}$ $T_{12}$ $T'_{13}$ $T_{21}$ $T_{23}$ $T'_{31}$ $T_{32}$ $T'_{33}$ |
| $T_{23}$ | L 11 | $T'_{12}$ $T_{13}$ $T'_{14}$ $T_{22}$ $T_{24}$ $T'_{32}$ $T_{33}$ $T'_{34}$ |
| $T_{24}$ | L 12 | $T'_{13}$ $T_{14}$ $T'_{15}$ $T_{23}$ $T_{25}$ $T'_{33}$ $T_{34}$ $T'_{35}$ |
| $T_{25}$ | L 13 | $T'_{14}$ $T_{15}$ $T'_{16}$ $T_{24}$ $T_{26}$ $T'_{34}$ $T_{35}$ $T'_{36}$ |
| $T_{26}$ | UNKNOWN | $T'_{15}$ $T_{16}$ $T'_{17}$ $T_{25}$ $T_{27}$ $T'_{35}$ $T_{36}$ $T'_{37}$ |
| $T_{27}$ | UNKNOWN | $T'_{16}$ $T_{17}$ $T'_{18}$ $T_{26}$ $T_{28}$ $T'_{38}$ $T_{37}$ $T'_{38}$ |
| $T_{28}$ | UNKNOWN | $T'_{17}$ $T_{18}$ $T_{27}$ $T'_{37}$ $T_{38}$ |
| $T_{31}$ | UNKNOWN | $T_{21}$ $T'_{22}$ $T_{32}$ $T_{41}$ $T'_{42}$ |
| $T_{32}$ | L 18 | $T'_{21}$ $T_{22}$ $T'_{23}$ $T_{31}$ $T_{33}$ $T'_{41}$ $T_{42}$ $T'_{43}$ |
| $T_{33}$ | L 19 | $T'_{22}$ $T_{23}$ $T'_{24}$ $T_{32}$ $T_{34}$ $T'_{42}$ $T_{43}$ $T'_{44}$ |
| $T_{34}$ | L 20 | $T'_{23}$ $T_{24}$ $T'_{25}$ $T_{33}$ $T_{35}$ $T'_{43}$ $T_{44}$ $T'_{45}$ |
| $T_{35}$ | L 21 | $T'_{24}$ $T_{25}$ $T'_{26}$ $T_{34}$ $T_{36}$ $T'_{44}$ $T_{45}$ $T'_{46}$ |
| $T_{36}$ | L 22 | $T'_{25}$ $T_{26}$ $T'_{27}$ $T_{36}$ $T_{37}$ $T'_{45}$ $T_{46}$ $T'_{47}$ |
| $T_{37}$ | UNKNOWN | $T'_{26}$ $T_{27}$ $T'_{28}$ $T_{36}$ $T_{38}$ $T'_{46}$ $T_{47}$ $T'_{48}$ |
| $T_{38}$ | UNKNOWN | $T'_{27}$ $T_{28}$ $T_{37}$ $T'_{47}$ $T_{48}$ |
| $T_{41}$ | UNKNOWN | $T_{31}$ $T'_{32}$ $T_{42}$ $T_{51}$ $T'_{52}$ |
| $T_{42}$ | UNKNOWN | $T'_{31}$ $T_{32}$ $T'_{33}$ $T_{41}$ $T_{43}$ $T'_{51}$ $T_{52}$ $T'_{53}$ |
| $T_{43}$ | L 27 | $T'_{32}$ $T_{33}$ $T'_{34}$ $T_{42}$ $T_{44}$ $T'_{52}$ $T_{53}$ $T'_{54}$ |
| $T_{44}$ | L 28 | $T'_{33}$ $T_{34}$ $T'_{35}$ $T_{43}$ $T_{45}$ $T'_{53}$ $T_{54}$ $T'_{55}$ |
| $T_{45}$ | L 29 | $T'_{34}$ $T_{35}$ $T'_{36}$ $T_{44}$ $T_{46}$ $T'_{54}$ $T_{55}$ $T'_{56}$ |
| $T_{46}$ | UNKNOWN | $T'_{35}$ $T_{36}$ $T'_{37}$ $T_{45}$ $T_{47}$ $T'_{55}$ $T_{56}$ $T'_{57}$ |
| $T_{47}$ | UNKNOWN | $T'_{36}$ $T_{37}$ $T'_{38}$ $T_{46}$ $T_{48}$ $T'_{56}$ $T_{57}$ $T'_{58}$ |
| .... | .... | .... |

| L1 | L2 | L3 | L4<br>$T_{14}$ | L5 | L6 | L7 | L8 |
|---|---|---|---|---|---|---|---|
| L9 | L10 | L11<br>$T_{23}$ | L12<br>$T_{24}$ | L13<br>$T_{25}$ | L14 | L15 | L16 |
| L17 | L18<br>$T_{32}$ | L19<br>$T_{33}$ | L20<br>$T_{34}$ | L21<br>$T_{35}$ | L22<br>$T_{36}$ | L23 | L24 |
| L25 | L26 | L27<br>$T_{43}$ | L28<br>$T_{44}$ | L29<br>$T_{45}$ | L30 | L31 | L32 |
| L33 | L34 | L35 | L36<br>$T_{54}$ | L37 | L38 | L39 | L40 |

FIG. 17

| TAG IDENTIFIER | LOCATION | NEIGHBOURING TAG IDENTIFIERS |
|---|---|---|
| .... | .... | .... |
| $T_{18}$ | UNKNOWN | $T_{17}$ $T'_{27}$ $T_{28}$ |
| $T_{21}$ | UNKNOWN | $T_{11}$ $T'_{12}$ $T_{22}$ $T_{31}$ $T'_{32}$ |
| $T_{22}$ | UNKNOWN | $T'_{11}$ $T_{12}$ $T'_{13}$ $T_{21}$ $T_{23}$ $T'_{31}$ $T_{32}$ $T'_{33}$ |
| $T_{23}$ | -2,2 | $T'_{12}$ $T_{13}$ $T'_{14}$ $T_{22}$ $T_{24}$ $T'_{32}$ $T_{33}$ $T'_{34}$ |
| $T_{24}$ | 0,2 | $T'_{13}$ $T_{14}$ $T'_{15}$ $T_{23}$ $T_{25}$ $T'_{33}$ $T_{34}$ $T'_{35}$ |
| $T_{25}$ | UNKNOWN | $T'_{14}$ $T_{15}$ $T'_{16}$ $T_{24}$ $T_{26}$ $T'_{34}$ $T_{35}$ $T'_{36}$ |
| $T_{26}$ | UNKNOWN | $T'_{15}$ $T_{16}$ $T'_{17}$ $T_{25}$ $T_{27}$ $T'_{35}$ $T_{36}$ $T'_{37}$ |
| $T_{27}$ | UNKNOWN | $T'_{16}$ $T_{17}$ $T'_{18}$ $T_{26}$ $T_{28}$ $T'_{38}$ $T_{37}$ $T'_{38}$ |
| $T_{28}$ | UNKNOWN | $T'_{17}$ $T_{18}$ $T_{27}$ $T'_{37}$ $T_{38}$ |
| $T_{31}$ | UNKNOWN | $T_{21}$ $T'_{22}$ $T_{32}$ $T_{41}$ $T'_{42}$ |
| $T_{32}$ | UNKNOWN | $T'_{21}$ $T_{22}$ $T'_{23}$ $T_{31}$ $T_{33}$ $T'_{41}$ $T_{42}$ $T'_{43}$ |
| $T_{33}$ | -2,0 | $T'_{22}$ $T_{23}$ $T'_{24}$ $T_{32}$ $T_{34}$ $T'_{42}$ $T_{43}$ $T'_{44}$ |
| $T_{34}$ | 0,0 | $T'_{23}$ $T_{24}$ $T'_{25}$ $T_{33}$ $T_{35}$ $T'_{43}$ $T_{44}$ $T'_{45}$ |
| $T_{35}$ | 2,0 | $T'_{24}$ $T'_{25}$ $T_{26}$ $T_{34}$ $T_{36}$ $T'_{44}$ $T_{45}$ $T'_{46}$ |
| $T_{36}$ | UNKNOWN | $T'_{25}$ $T_{26}$ $T'_{27}$ $T_{36}$ $T_{37}$ $T'_{45}$ $T_{46}$ $T'_{47}$ |
| $T_{37}$ | UNKNOWN | $T'_{26}$ $T_{27}$ $T'_{28}$ $T_{36}$ $T_{38}$ $T'_{46}$ $T_{47}$ $T'_{48}$ |
| $T_{38}$ | UNKNOWN | $T'_{27}$ $T_{28}$ $T_{37}$ $T'_{47}$ $T_{48}$ |
| $T_{41}$ | UNKNOWN | $T_{31}$ $T'_{32}$ $T_{42}$ $T_{51}$ $T'_{52}$ |
| $T_{42}$ | UNKNOWN | $T'_{31}$ $T_{32}$ $T'_{33}$ $T_{41}$ $T_{43}$ $T'_{51}$ $T_{52}$ $T'_{53}$ |
| $T_{43}$ | UNKNOWN | $T'_{32}$ $T_{33}$ $T'_{34}$ $T_{42}$ $T_{44}$ $T'_{52}$ $T_{53}$ $T'_{54}$ |
| $T_{44}$ | 0,-2 | $T'_{33}$ $T_{34}$ $T'_{35}$ $T_{43}$ $T_{45}$ $T'_{53}$ $T_{54}$ $T'_{55}$ |
| $T_{45}$ | UNKNOWN | $T'_{34}$ $T_{35}$ $T'_{36}$ $T_{44}$ $T_{46}$ $T'_{54}$ $T_{55}$ $T'_{56}$ |
| $T_{46}$ | UNKNOWN | $T'_{35}$ $T_{36}$ $T'_{37}$ $T_{45}$ $T_{47}$ $T'_{55}$ $T_{56}$ $T'_{57}$ |
| $T_{47}$ | UNKNOWN | $T'_{36}$ $T_{37}$ $T'_{38}$ $T_{46}$ $T_{48}$ $T'_{56}$ $T_{57}$ $T'_{58}$ |
| .... | .... | .... |

250

FIG. 19

SYSTEMS AND METHODS OF DEPLOYING LOCATION TRACKING TAGS

CROSS-REFERENCE TO RELATED APPLICATIONS

This patent arises from a continuation of U.S. application Ser. No. 15/218,721, filed Jul. 25, 2016, the contents of which is incorporated herein by reference.

The present application is related to U.S. patent application Ser. No. 15/218,158, filed Jul. 25, 2016, and entitled "Remotely Configurable Location Tracking Tags"; the present application and U.S. patent application Ser. No. 15/218, 158 are commonly owned by Zebra Technologies Corporation.

BACKGROUND

Tag-based location tracking/proximity sensing is becoming a common method of tracking devices in stores, warehouses and the like using, for example, BLE™ (Bluetooth™ Low Energy) Tags, Bluetooth™ Smart Tags, iBeacon™ tags and the like. Such tag-location tacking systems usually consist of a location tracking server, tags fixed throughout a physical location, and devices to be tracked, each of which communicates with the tags and the location tracking server using, for example, client software that runs on the devices. Furthermore, the tags are generally fixed on all the locations in the physical space through which the devices will be moving, and the locations are hence generally identified and stored at the location tacking server. To get 1 meter accuracy on a location of device, tags can be fixed every 2 meters within the physical space in a grid layout, and hence, with large spaces, large numbers of tags are deployed.

Once the tags are physically fixed in their respective locations, a mapping between the tags and their locations needs to be created in the location tracking server. Presently, such mapping tends to be manual: i.e., someone physically goes to each tag location, retrieves a tag identifier from each tag at each tag location, determines a location (e.g. using GPS (Global Positioning System) coordinates and the like) and enters all this data into the location tracking server. Such methods are time consuming and as the number of tags increase, the time and effort to manually build the mapping (e.g. tag id vs. location) also increases. Furthermore, when a layout of a physical space changes, the mapping process needs to be repeated.

In addition, management and control of such tags can be challenging. For example, when a configuration parameter of a tag needs to be changed (such as a beacon interval, a major number, a minor number, a broadcast power level, and the like), an operator needs to go near the tag and change the desired parameter via a control terminal, such as a mobile device. Such a procedure can be expensive, time consuming and error prone, especially when configuration parameters at a large number of tags are to be changed, which is common when a layout of a physical space changes and/or the locations of the tags change.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate implementations of concepts described herein, and explain various principles and advantages of those implementations.

FIG. 9 depicts a portion of a database and/or table stored at the server of the system of FIG. 1, prior to a determination of tag locations, according to non-limiting implementations.

FIG. 11 depicts a map of zones of a physical space in which the tags of the system of FIG. 1 are deployed, according to non-limiting implementations.

FIG. 12 depicts the portion and/or table of FIG. 9 after the locations of the subset of tags are received, according to non-limiting implementations.

FIG. 13 depicts a position of the subset of tags on the map of FIG. 11, according to non-limiting implementations.

FIG. 14 depicts the portion and/or table of FIG. 12 after locations of some of the remaining tags are determined using an intersection operation, according to non-limiting implementations.

FIG. 15 depicts a position of the tags for which locations have been determined on the map of FIG. 11, according to non-limiting implementations.

FIG. 16 depicts the portion and/or table of FIG. 14 after locations of more of the remaining tags are determined using an intersection operation, according to non-limiting implementations.

FIG. 17 depicts a position of more of the tags for which locations have been determined on the map of FIG. 11, according to non-limiting implementations.

FIG. 19 depicts the portion and/or table of FIG. 9 after the locations of the subset of tags are received, according to alternative non-limiting implementations.

Figure 1:
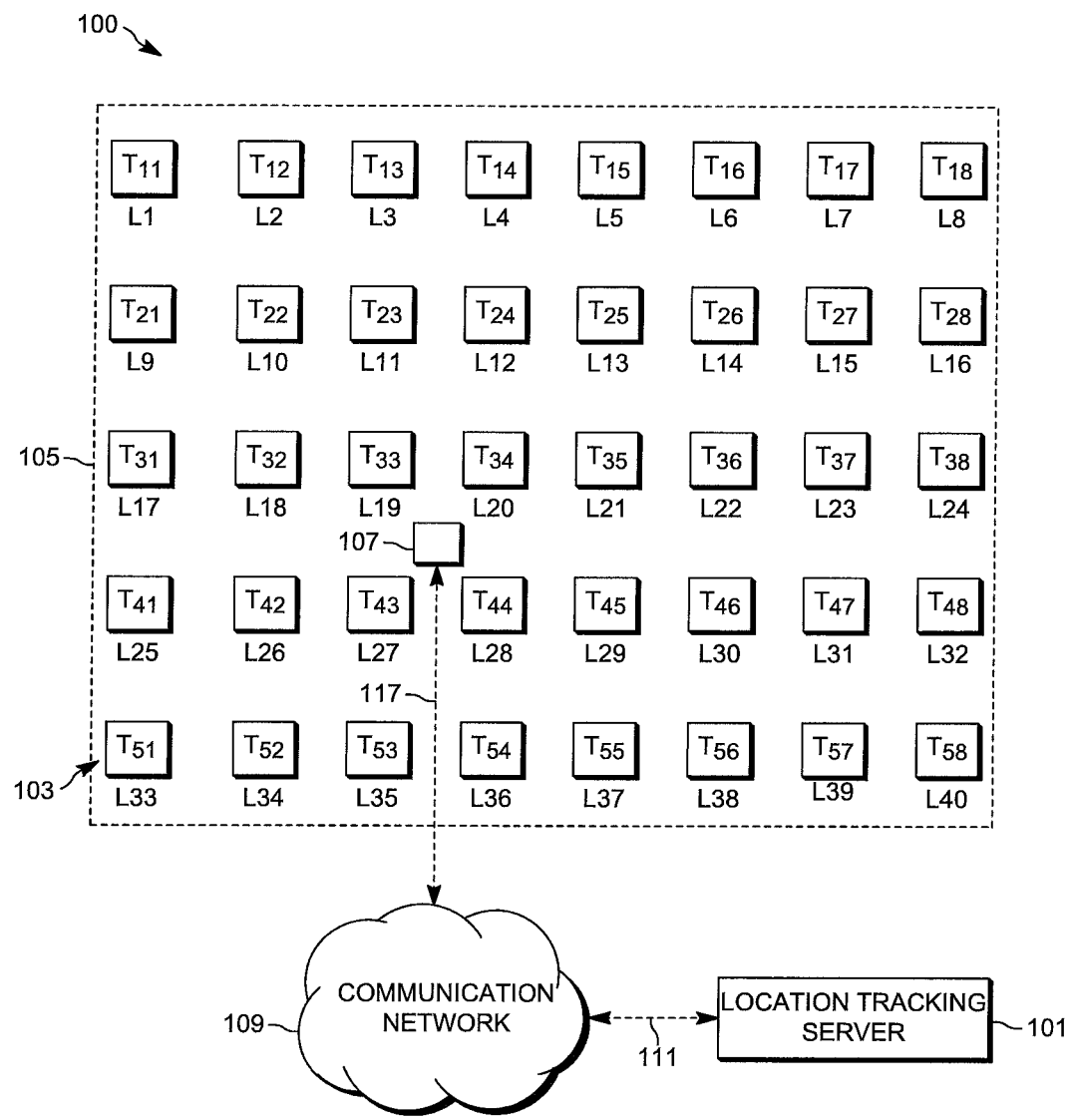
FIG. 1 depicts a schematic diagram of a system for mapping tag locations, according to non-limiting implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present specification.

The apparatus and method components have been represented where appropriate by conventional symbols in the drawings, showing only those specific details that are pertinent to understanding the implementations of the present specification so as not to obscure the disclosure with details that will be readily apparent to those of ordinary skill in the art having the benefit of the description herein.

DETAILED DESCRIPTION

An aspect of the specification provides a device comprising: a processor; a memory; and a communication interface, the processor configured to: receive, using the communication interface: identifiers of a plurality of tags fixed at locations in a physical space, each of the plurality of tags configured to broadcast: a respective identifier; and identifiers of respective neighboring tags of each of the plurality of tags; receive respective locations of a subset of the plurality of tags; and, determine remaining respective locations of the plurality of tags not in the subset from: the respective locations of the plurality of tags in the subset and the identifiers of respective neighboring tags of each of the plurality of tags.

The processor can be further configured to determine the remaining respective locations of the plurality of tags not in the subset using one or more of: an intersection operation and triangulation based on a detected broadcast power level of each of the respective neighboring tags received with the identifiers of the respective neighboring tags of each of the plurality of tags.

At least three of the tags in the subset can be neighbors, and the processor can be further configured to: determine common neighboring tags of the at least three of the tags using an intersection of the identifiers of the respective neighboring tags of the at least three of the tags, the common neighboring tags not in the subset; and, determine the remaining respective locations of the common neighboring tags from a respective detected broadcast power level of each of the common neighboring tags associated with each of the at least three of the tags, the respective broadcast power level received with the respective identifiers of the respective neighboring tags of each of the plurality of tags.

The processor can be further configured to iteratively: determine common neighboring tags of the plurality of tags for which respective physical locations have been previously determined; and determine the remaining respective locations of the common neighboring tags from a respective detected broadcast power level of each of the common neighboring tags associated with each of the plurality of tags for which the respective physical locations have been previously determined, the respective detected broadcast power level received with the identifiers of the respective neighboring tags of each of the plurality of tags.

Each of the respective locations can comprise one or more of GPS (global positioning system) coordinates, absolute location data, and relative location data, the relative location data being relative to a given position in the physical space.

The memory can stores a map of zones of the physical space, the respective locations of the subset of the plurality of tags each comprising a respective zone, the processor further configured to: determine that each of the zones comprises one of the plurality of tags; and, determine remaining respective locations of the plurality of tags not in the subset from intersections of the identifiers of the respective neighboring tags of the tags in the subset and the map.

The processor can be further configured to determine a distance between neighboring tags based on a respective detected broadcast power level, of each of the respective neighboring tags, received with the identifiers of the respective neighboring tags of each of the plurality of tags.

The processor can be further configured to populate one or more of a database and a table stored at the memory with data associated with the plurality of tags, the data including the respective location of each of the plurality of tags and the identifiers of the respective neighboring tags of each of the plurality of tags.

Each of the plurality of tags can comprise one or more of a location tracking tag, a BLE (Bluetooth™ low energy) tag, a Bluetooth™ Smart tag, and an iBeacon™ tag, each configured to determine and broadcast a respective identifier and identifiers of the neighboring tags.

The processor can be further configured to receive the identifiers of the plurality of tags, and the identifiers of the respective neighboring tags of each of the plurality of tags.

Another aspect of the specification provides a method comprising: receiving, at a device, using a communication interface: identifiers of a plurality of tags fixed at locations in a physical space, each of the plurality of tags configured to broadcast: a respective identifier; and identifiers of respective neighboring tags of each of the plurality of tags; receiving, at the device, respective locations of a subset of the plurality of tags; and, determining, at the device, remaining respective locations of the plurality of tags not in the subset from: the respective locations of the plurality of tags in the subset and the identifiers of respective neighboring tags of each of the plurality of tags.

The method can further comprise determining the remaining respective locations of the plurality of tags not in the subset using one or more of: an intersection operation and triangulation based on a detected broadcast power level of each of the respective neighboring tags received with the identifiers of the respective neighboring tags of each of the plurality of tags.

At least three of the tags in the subset can be neighbors, and the method can further comprise: determining common neighboring tags of the at least three of the tags using an intersection of the identifiers of the respective neighboring tags of the at least three of the tags, the common neighboring tags not in the subset; and, determining the remaining respective locations of the common neighboring tags from a respective detected broadcast power level of each of the common neighboring tags associated with each of the at least three of the tags, the respective broadcast power level received with the respective identifiers of the respective neighboring tags of each of the plurality of tags.

The method can further comprise iteratively: determining common neighboring tags of the plurality of tags for which respective physical locations have been previously determined; and determining the remaining respective locations of the common neighboring tags from a respective detected broadcast power level of each of the common neighboring tags associated with each of the plurality of tags for which the respective physical locations have been previously determined, the respective detected broadcast power level received with the identifiers of the respective neighboring tags of each of the plurality of tags.

Each of the respective locations can comprise one or more of GPS (global positioning system) coordinates, absolute location data, and relative location data, the relative location data being relative to a given position in the physical space.

The memory can store a map of zones of the physical space, the respective locations of the subset of the plurality of tags each comprising a respective zone, and the method can further comprise: determining that each of the zones comprises one of the plurality of tags; and, determining remaining respective locations of the plurality of tags not in the subset from intersections of the identifiers of the respective neighboring tags of the tags in the subset and the map.

The method can further comprise determining a distance between neighboring tags based on a respective detected broadcast power level, of each of the respective neighboring tags, received with the identifiers of the respective neighboring tags of each of the plurality of tags.

The method can further comprise populating one or more of a database and a table stored at the memory with data associated with the plurality of tags, the data including the respective location of each of the plurality of tags and the identifiers of the respective neighboring tags of each of the plurality of tags.

Each of the plurality of tags can comprise one or more of a location tracking tag, a BLE (Bluetooth™ low energy) tag, a Bluetooth™ Smart tag, and an iBeacon™ tag, each configured to determine and broadcast a respective identifier and identifiers of the neighboring tags.

Another aspect of the specification provides a computer-readable medium storing a computer program, wherein execution of the computer program is for: receiving, at a device, using a communication interface: identifiers of a plurality of tags fixed at locations in a physical space, each of the plurality of tags configured to broadcast: a respective identifier; and identifiers of respective neighboring tags of each of the plurality of tags; receiving, at the device, respective locations of a subset of the plurality of tags; and, determining, at the device, remaining respective locations of the plurality of tags not in the subset from: the respective locations of the plurality of tags in the subset and the identifiers of respective neighboring tags of each of the plurality of tags. The computer-readable medium can comprise a non-transitory computer-readable medium.

Another aspect of the specification provides a tag comprising: a processor, a memory storing an identifier, and a wireless communication interface configured to broadcast the identifier, the processor configured to: receive, from the wireless communication interface, identifiers of neighboring tags; store the identifiers of the neighboring tags in the memory; and, modify the broadcast of the identifier to include the identifiers of the neighboring tags.

The processor can be further configured to: determine detected broadcast power levels of the neighboring tags and modify the broadcast of the identifier to include the identifiers of the neighboring tags and their detected broadcast power levels.

The processor can be further configured to: determine broadcast power levels of the neighboring tags, store the identifiers of the neighboring tags in the memory in association with their broadcast power levels and modify the broadcast of the identifier to include the identifiers of the neighboring tags and their detected broadcast power levels.

The tag can further comprise one or more of a location tracking tag, a BLE (Bluetooth™ low energy) tag, a Bluetooth™ Smart tag, an iBeacon™ tag, and one or more mounting devices.

Another aspect of the specification provides a method, at a tag including: a processor, a memory storing an identifier, and a wireless communication interface configured to broadcast the identifiers, receiving, at the tag, identifiers of neighboring tags; storing the identifiers of the neighboring tags in the memory; and, modifying the broadcast of the identifier by the wireless communication interface to include the identifiers of the neighboring tags.

The method can further comprise: determining detected broadcast power levels of the neighboring tags and modifying the broadcast of the identifier to include the identifiers of the neighboring tags and their detected broadcast power levels.

The method can further comprise: determining broadcast power levels of the neighboring tags, storing the identifiers of the neighboring tags in the memory in association with their broadcast power levels and modifying the broadcast of the identifier to include the identifiers of the neighboring tags and their detected broadcast power levels.

The tag can further comprise one or more of a location tracking tag, a BLE (Bluetooth™ low energy) tag, a Bluetooth™ Smart tag, an iBeacon™ tag, and one or more mounting devices.

Another aspect of the specification provides a computer-readable medium storing a computer program, wherein execution of the computer program is for: at a tag including: a processor, a memory storing an identifier, and a wireless communication interface configured to broadcast the identifiers, receiving, at the tag, identifiers of neighboring tags; storing the identifiers of the neighboring tags in the memory; and, modifying the broadcast of the identifier by the wireless communication interface to include the identifiers of the neighboring tags. The computer-readable medium can comprise a non-transitory computer-readable medium.

Attention is directed to FIG. 1 which depicts a schematic diagram of a system 100 configured for mapping of tag locations. System 100 comprises a location tracking server 101 (interchangeably referred to herein as server 101), a plurality of tags 103 fixed at respective locations in a physical space 105 interchangeably referred to herein as space 105), a mobile device 107 (interchangeably referred to herein as device 107), and a communication network 109 (interchangeably referred to herein as network 109).

Each of the plurality of tags 103 is identified with a respective identifier, for example T11, T12, and so on, and the plurality of tags 103 are fixed in a grid in space 105, and depicted in rows offset from one another such that, in FIG. 1, the plurality of tags 103 are arranged in rows and columns. It is nonetheless appreciated that each of the plurality of tags 103 are arranged in a grid in space 105 and visual depiction of the plurality of tags 103 in the rows and columns provided merely for convenience with respect to FIG. 1.

In FIG. 1, a respective location of each of the plurality of tags 103 is indicated below each of the plurality of tags 103, each location identified using "L" as a prefix, for example L1, L2, L3, and so on. Furthermore, while the plurality of tags 103 will be interchangeably referred to hereafter, collectively, as tags 103 and, generically, as a tag 103, when a specific tag 103 is referred to herein, a respective identifier as indicated in FIG. 1 will be used; for example, a tag 103 in the third row and the fourth column will be referred to as tag T34, where "3" indicates a row number and "4" indicates a column number; hence, for example, tag T34 is located at location L20. This convention will be used throughout the present specification.

Each of the plurality of tags 103 are configured to broadcast data, as described in more detail below, and receive data broadcast from neighboring tags 103. Furthermore, device 107 is configured to receive data broadcast from tags 103, for example when device 107 is in proximity to a tag 103. Device 107 is further configured to relay data received from tags 103 to server 101 using network 109 and a communication link 111 between server 101 and network 109, and a communication link 117 between device 107 and network 109. Link 117 is generally wireless, such that device 107 can be moved throughout space 105 and communicate with tags 103 when in proximity thereto, and link 111 can be wireless and/or wired, as desired. Indeed, each of links 111, 117 can comprise any suitable combination of wired or wireless networks as desired, including but not limited to a packet based network, the Internet, an analog network, the PSTN (public switched telephone network), a WiFi network, a WiMax network and the like.

Each of server 101, tags 103, space 105, and device 107 will now be described in more detail.

Figure 2:
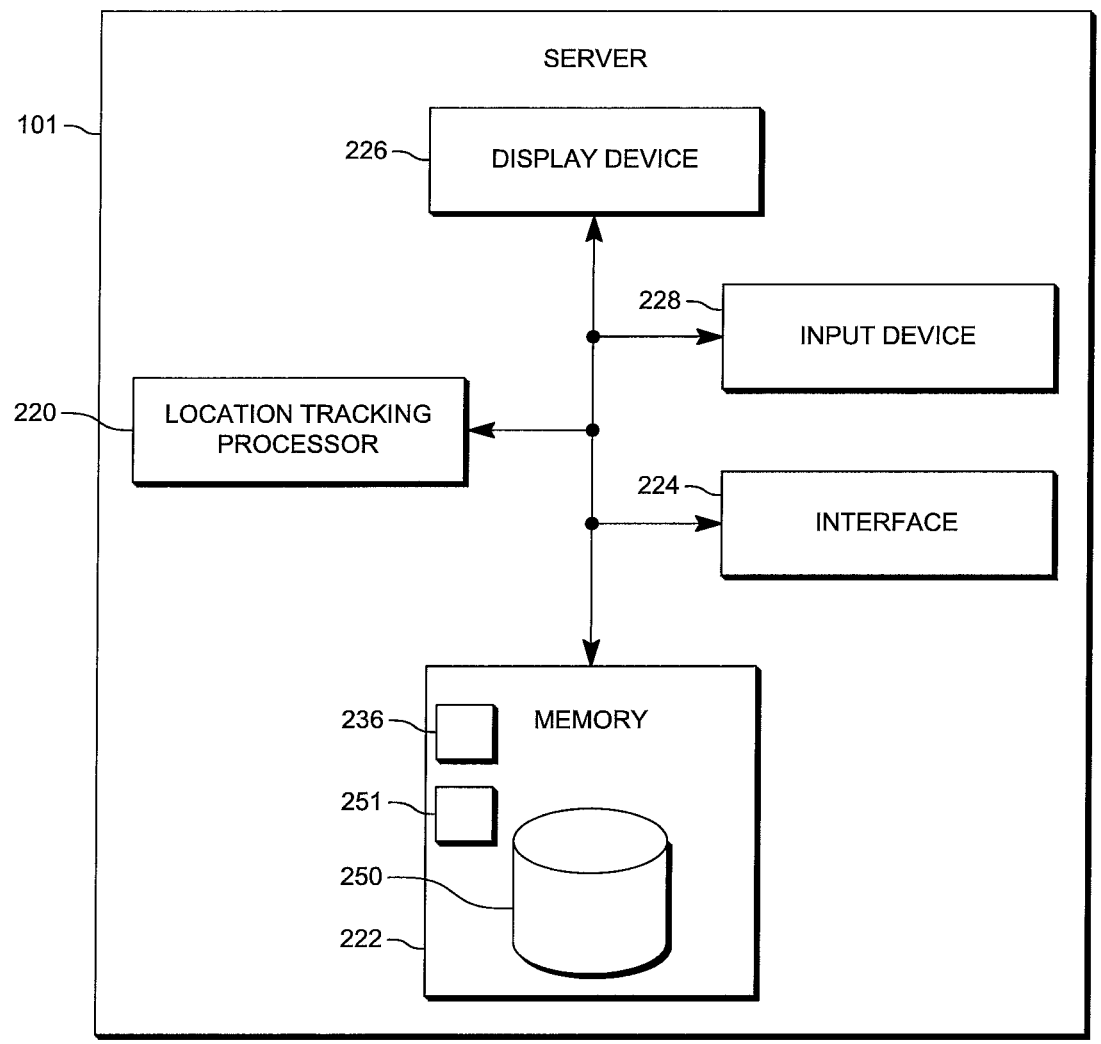
FIG. 2 depicts a schematic diagram of a server of the system of FIG. 1, according to non-limiting implementations.

Attention is next directed to FIG. 2 which depicts a schematic diagram of server 101. Server 101 comprises: a processor 220; a memory 222; and a communication interface 224 (interchangeably referred to hereafter as interface 224). As depicted, server 101 further comprises a display device 226 and at least one input device 228, however such components are optional. Furthermore, when present, display device 226 and input device 228 can also be external to server 101, and processor 220 can be in communication with any such external components via a suitable connection and/or link.

Processor 220 is generally configured to: receive, using communication interface 224: identifiers a plurality of tags 103 fixed at respective locations in physical space 105, each of plurality of tags 103 configured to broadcast a respective identifier; respective identifiers of respective neighboring tags 103 of each of plurality of tags 103; and, optionally, respective detected broadcast power level of each of the respective neighboring tags 103. Such broadcasting will be described in further detail below. Processor 220 is further configured to receive respective locations of a subset plurality of tags 103, a number of the plurality of tags 103 in the subset being less than a total number of the plurality of tags. Processor 220 is further configured to: determine remaining respective locations of the plurality of tags 103 not in the subset from: the respective locations of the subset; the respective identifiers of respective neighboring tags 103 of each of plurality of tags 103; and, optionally, the respective detected broadcast power level of each of the respective neighboring tags 103.

Indeed, server 101 can comprise any computing device suitable for processing data received from tags 103, for example via device 107, including, but not limited to, a personal computer, a laptop computer and any suitable server device, which can be commercially available and/or specifically configured for location tracking of devices moving in space 105. Indeed, any device and/or computing device which can be configured for location tracking of devices moving in space 105 is within the scope of present implementations. As such server 101 can include, but is not limited to, a location tracking device, a location tracking engine, and a location tracking unit, and the like. Indeed, in some implementations, server 101 can be implemented on a portable device and/or a mobile device.

Processor 220 can comprise a processor and/or a plurality of processors, including but not limited to one or more central processors (CPUs) and/or one or more processing units and/or one or more graphic processing units (GPUs); either way, processor 220 comprises a hardware element and/or a hardware processor. Indeed, in some implementations, processor 220 can comprise an ASIC (application-specific integrated circuit) and/or an FPGA (field-programmable gate array) specifically configured to implement the functionality of server 101. In other words, processor 220 can comprise a location tracking processor, and hence, server 101 is preferably not a generic computing device, but a device specifically configured to implement specific functionality including: determining locations of tags 103 from data received therefrom. For example, server 101 and/or processor 220 can specifically comprise a computer executable engine configured to perform location-related services associated with tags fixed in a physical space.

Memory 222 can comprise a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of server 101 as described herein are typically maintained, persistently, in memory 222 and used by processor 220 which makes appropriate utilization of volatile storage during the execution of such programming instructions. Those skilled in the art recognize that memory 222 is an example of computer readable media that can store programming instructions executable on processor 220. Furthermore, memory 222 is also an example of a memory unit and/or memory module and/or a non-volatile memory.

In particular, memory 222 can store an application 236 that, when executed by processor 220, enables processor 220 to: receive, using communication interface 224: identifiers a plurality of tags 103 fixed at respective locations in physical space 105, each of plurality of tags 103 configured to broadcast a respective identifier; respective identifiers of respective neighboring tags 103 of each of plurality of tags 103; and, optionally, a respective detected broadcast power level of each of the respective neighboring tags 103; receive respective locations of a subset plurality of tags 103, a number of the plurality of tags 103 in the subset being less than a total number of the plurality of tags; and, determine remaining respective locations of the plurality of tags 103 not in the subset from: the respective locations of the subset; the respective identifiers of respective neighboring tags 103 of each of plurality of tags 103; and, optionally, the respective detected broadcast power level of each of the respective neighboring tags 103.

Memory 222 further stores a database 250 and/or table that is populated by processor 220; specifically, database 250 can comprise a database, and the like, of identifiers of tags 103 that are associated with respective locations by processor 220, as described in more detail below. While data in database 250 can be configured in a database format, as depicted, such data can be in any other suitable format including, but not limited to a table format, or any other suitable format. Nonetheless, for convenience, functionality of server 101 will be described with respect to populating database 250. Initially, database 250 can be blank and/or empty, but populated as data from tags 103 is received from device 107.

Memory 222 can optionally store a map 251 of space 105; for example map 251 can indicate generic positions and/or zones of space 105 into which tags 103 are to be deployed; however map 251 does not store deployed positions of tags 103. Map 251 is described in more detail below with respect to FIG. 11.

As depicted, processor 220 also connects to interface 224, which can be implemented as one or more radios and/or connectors and/or network adaptors, configured to communicate wired and/or wirelessly with one or more communication networks, including network 109. It will be appreciated that interface 224 is configured to correspond with network architecture that is used to implement one or more communication links 111 to network 109, including but not limited to any suitable combination of USB (universal serial bus) cables, serial cables, wireless links, cell-phone links, cellular network links (including but not limited to 2G, 2.5G, 3G, 4G+ such as UMTS (Universal Mobile Telecommunications System), GSM (Global System for Mobile Communications), CDMA (Code division multiple access), FDD (frequency division duplexing), LTE (Long Term Evolution), TDD (time division duplexing), TDD-LTE (TDD-Long Term Evolution), TD-SCDMA (Time Division Synchronous Code Division Multiple Access) and the like, wireless data, WLAN (wireless local area network) links, WiFi links, WiMax links, packet based links, the Internet, analog networks, the PSTN (public switched telephone network), access points, and the like, and/or a combination.

Processor 220 can be further configured to communicate with optional display device 226, which comprises any suitable one of, or combination of, flat panel displays (e.g. LCD (liquid crystal display), plasma displays, OLED (organic light emitting diode) displays, capacitive or resistive touchscreens, CRTs (cathode ray tubes) and the like). Processor 220 be further configured to communicate with input device 228, which is configured to receive input data; as such, input device 228 can comprise any suitable combination of input devices, including but not limited to a keyboard, a keypad, a pointing device, a mouse, a track wheel, a trackball, a touchpad, a touch screen (e.g. integrated with display device 226), and the like. Other suitable input devices are within the scope of present implementations.

While not depicted, server 101 further comprises a power supply, including, but not limited to, a connection to a mains power supply and/or a power adaptor (e.g. and AC-to-DC (alternating current to direct current) adaptor), and alternatively a battery, a power pack and the like. In general the power supply powers components of server 101.

Hence, it should be understood that in general a wide variety of configurations for server 101 are contemplated and server 101 can include other components, including, but not limited to, a speaker, a microphone and the like.

Figure 3:
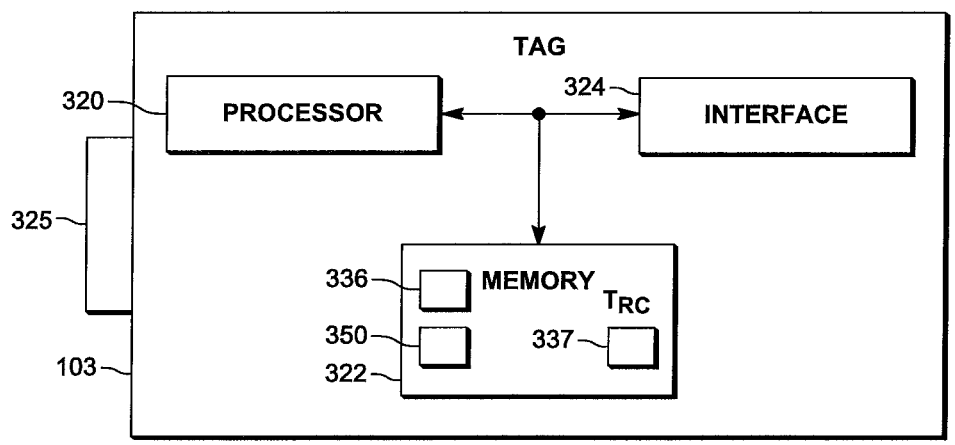
FIG. 3 depicts a schematic diagram of a tag of the system of FIG. 1, according to non-limiting implementations.

Attention is next directed to FIG. 3 which depicts a schematic diagram of a tag 103, which comprises: a processor 320; a memory 322; and a wireless communication interface 324 (interchangeably referred to hereafter as interface 324). Each of processor 320, memory 322 and wireless communication interface 324 is generally similar, respectively, to processor 220, memory 222 and interface 224, though adapted and/or selected and/or configured for use with tag 103. Hence, interface 324 is generally configured to communicate wirelessly, and not in a wired manner. Furthermore, processor 320 and memory 322 are selected for compatibility with tag 103, rather than for compatibility with a more complex computing environment as can exist in server 101.

As depicted, tag 103 further comprises an optional mounting apparatus 325, for example located on an outer surface of a chassis and/or a housing of tag 103, mounting apparatus 325 configured to mount and/or fix and/or deploy tag 103 within space 105. However, such mounting apparatus 325 can further be external to tag 103. Mounting apparatus 325 can include, but is not limited to, any combination of fasteners, bolts, screws, glues, epoxies, glue strips, epoxy strips, hook-and-loop devices, Velcro™, and the like. While also not depicted, tag 103 comprises a battery, a power pack and the like, which powers components of tag 103 including, but not limited to, processor 320 and interface 324.

Programming instructions that implement the functional characteristics of tag 103 as described herein are typically maintained, persistently, in memory 322 and used by processor 320 which makes appropriate utilization of volatile storage during the execution of such programming instructions. Memory 322 further stores an application 336 that, when executed by processor 320, enables processor 320 to implement the functionality of tag 103.

Memory 322 further stores a respective identifier (as depicted "TRC", where "R" is a row number and "C" is a column number according to the convention of FIG. 1). The respective identifier "TRC" stored in memory 222 can be provisioned at memory 222 for example, a factory and/or in a provisioning process. Interface 224 is generally configured to wirelessly broadcast respective identifier "TRC", as described below.

Respective identifier "TRC" can include, but is not limited to, an identifier used by an application layer of components of system 100. Memory 322 can store a second identifier 337 which can be used by a management layer of components of system 100; such a second identifier 337 can include, but is not limited to, a MAC (media access control) address. Such layers, when present, can be layers of the Open Systems Interconnection (OSI) model, layers of a TCP/IP (Transmission Control Protocol/Internet Protocol) model, and/or layers of any communication protocol being used to communicate between components in system 100. In any event, it is appreciated that identifier "TRC" can be configurable and/or changeable by other components of system 100, while second identifier 337, such as the MAC address, is generally not configurable and/or changeable, by other components of system 100 after provisioning.

Memory 322 further stores configuration data 350 which can include parameters on how interface 324 broadcasts respective identifier "TRC", and/or other data; in particular, configuration data 350 can include, but is not limited to a rate (which can also be interchangeably referred to as a "beacon interval") at which respective identifier broadcasts (e.g. a number of times per second, a number of times per minute, and the like). However, configuration data 350 can further store a transmit power level and/or broadcast power level. In some implementations, configuration data 350 can comprise identifier "TRC": in other words, while identifier "TRC" is depicted as separate from configuration data 350, identifier "TRC" can comprise a parameter of configuration data 350.

In some implementations, configuration data 350 can further store parameters which can define subspaces within space 105; such parameters can include, but are not limited to, "Major" numbers and "Minor" numbers which can comprise settings which can be used to connect to specific tags 103 and/or to work with and/or group together more than one tag 103 at the same time; such parameters can be used with iBeacon™ tags, but similar parameters can be used with other types of tags 103. For example, a plurality of iBeacon™ tags deployed at a venue, such as space 105, can share the same UUID (Universally Unique Identifier), and use the major numbers and minor numbers to segment and distinguish subspaces within the venue. For example, the Major numbers of all iBeacon™ tags in a specific venue can be set to the same value and the Minor number can be used to identify a specific iBeacon™ tags within the venue. Indeed, a UUID is another example of a parameter that can be configured at a tag 103 using configuration data 350.

In any event, interface 324 is generally configured to wirelessly broadcast respective identifier "TRC" over a limited range and/or a short range, for example over a radius of about 1 meter or so, which is generally a function of a broadcast power level stored in configuration data 350. Indeed, the range of broadcast of interface 324 and/or tag 103 can govern a density of tags 103 in space 105: for example, tag 103 can comprise one or more of a BLE™ (Bluetooth™ Low Energy) Tag, a Bluetooth™ Smart Tag, an iBeacon™ tag and the like; such tags are configured to broadcast data over a limited range, for example a few meters or less. Deployment of tags 103 is space 105 is described in more detail below.

Furthermore, interface 324 is generally configured to receive, from neighboring tags 103 (presuming tag 103 is within a broadcast range of one or more neighboring tags 103) respective identifiers (e.g. similar to identifier "TRC", and/or other data, broadcast by neighboring tags 103. Once received, such respective identifiers can be stored in memory 322. In present implementations, interface 324 can be further configured to broadcast data other than a respective identifier "TRC", including, but not limited to, respective identifiers of neighboring tags 103, once such respective identifiers are received.

Interface 324 can be further configured to receive data, from device 107 including, but not limited to, handshake data, and/or data for storage in memory 322 including, but not limited to updates to configuration data 350.

Optionally, interface 324 and/or processor 320 and/or tag 103 can be further configured to determine respective broadcast power levels of neighboring tags 103, for example a broadcast power level of data broadcast by neighboring tags 103, including, but not limited to, respective identifiers thereof. As such, interface 324 and/or tag 103 can further comprise apparatus (including, but not limited to a radio device) for determining a power level of wirelessly received data. For example, when a respective identifier of a neighboring tag 103 is received, a power level of the broadcast in which the respective identifier was received can be determined. Such respective powers can be stored in memory 322 associated with a respective identifier "TRC" of the neighboring tag 103. Such respective powers can optionally be broadcast by tag 103 with the respective identifiers TRC of neighboring tags 103. Whether tag 103 determines and broadcasts such respective powers of neighboring tags can be indicated in configuration data 350 (presuming tag 103 is enabled to make such a determination).

When interface 324 broadcasts data other than the respective identifier "TRC" of tag 103, the other data can be broadcast in a format that indicates the type of other data being broadcast; for example, when the data being broadcast includes: respective identifier "TRC" of tag 103, respective identifiers of neighboring tags 103, and, optionally, associated broadcast power levels of each, the data can be formatted such that a data type of each is determinable, for example by including each data type in a specific order and/or with a specific identifier of each.

As described above, memory 322 further stores an application 336. When application 336 is executed by processor 320, processor 320 is enabled to: receive, from wireless communication interface 324, respective identifiers of neighboring tags 103; optionally determine respective broadcast power levels of the neighboring tags 103; store the respective identifiers of neighboring tags 103 in memory 322 (an optionally in association with the respective broadcast power levels); and, modify the broadcast of the respective identifier "TRC" to include the respective identifiers of neighboring tags 103 and, optionally, their respective broadcast power levels.

In other words, tag 103 is generally configured to collect identifiers of neighboring tags 103, optionally configured to determine broadcast power levels of each, and broadcast such data in association with each other, along with its own respective identifier "TRC". Indeed, in some implementations, tag 103 can comprise one or more of a location tracking tag, a BLE (Bluetooth™ low energy) tag, a Bluetooth™ Smart tag, and a iBeacon™ tag, modified to determine and broadcast a respective identifier and respective identifiers of the neighboring tags 103.

Such data, which can be referred to as neighbor data for convenience, can be collected by device 107 from each of tags 103 in space 105, as device 107 is transported through space 105 (e.g. when device 107 is proximal to each of tags 103 in space 105), and then such neighbor data can be transmitted from device 107 to server 101.

As such, device 107 generally comprises a mobile device, including, but not limited to, any suitable combination of electronic devices, communications devices, computing devices, personal computers, laptop computers, portable electronic devices, mobile computing devices, portable computing devices, tablet computing devices, laptop computing devices, desktop phones, telephones, PDAs (personal digital assistants), cellphones, smartphones, e-readers, internet-enabled appliances, mobile camera devices and the like that are specially configured for collecting data from tags 103. Other suitable devices are within the scope of present implementations. For example, device 107 need not comprise a mobile communication device, but rather can comprise a device with specialized functions, for example a device having warehouse inventory tracking and/or other data acquisition functionality, such as a mobile scanner having one or more of radio frequency identification (RFID) reader, Near Field Communication (NFC) reader, imager, and/or laser-based scanner data acquisition components. In yet further implementations, device 107 can be mountable in a vehicle configured for movement in space 105.

While a specific physical configuration of device 107 is depicted in FIG. 1 (e.g. as a portable and/or mobile electronic device), other physical configurations of device 107 are within the scope of present implementations. For example, device 107 can further include one or more handles, as well as a trigger for triggering the data acquisition components and the like.

Figure 4:
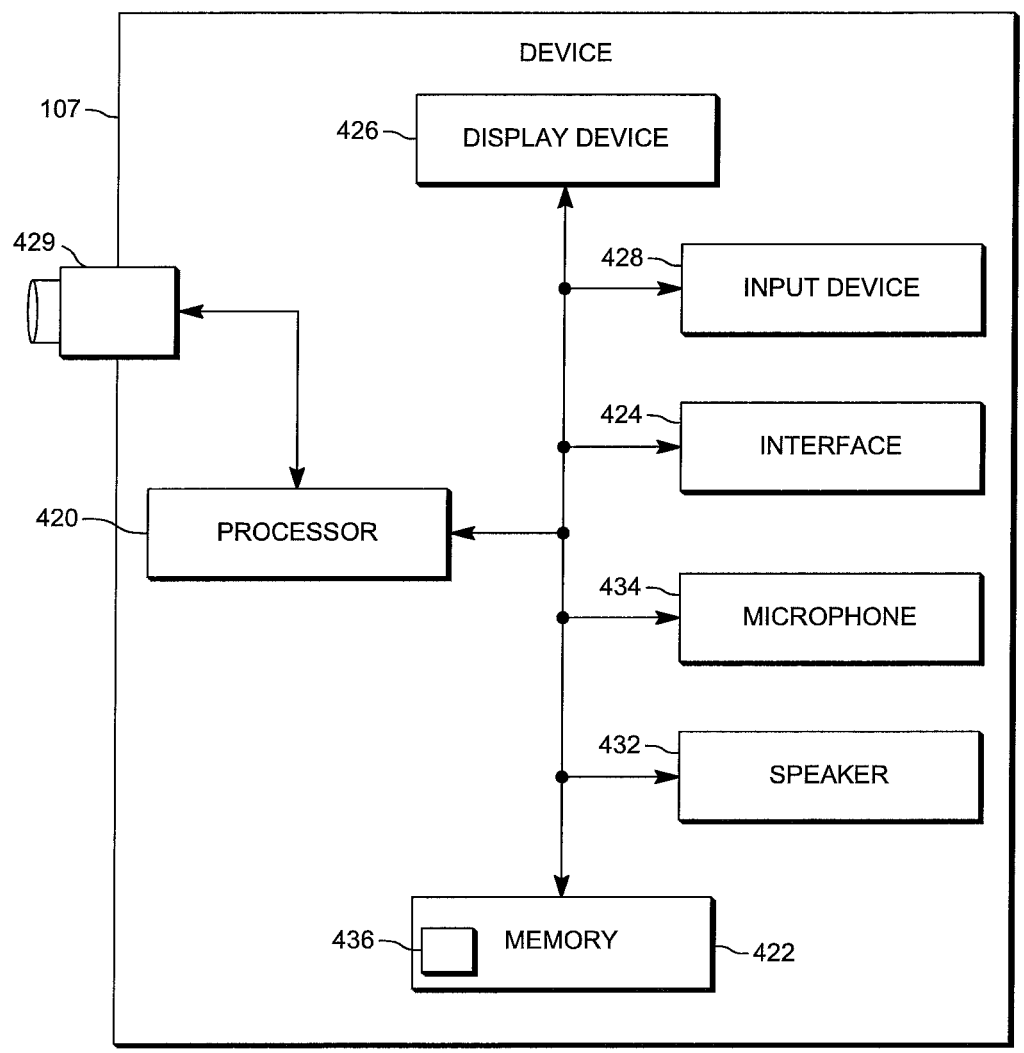
FIG. 4 depicts a schematic diagram of a mobile of the system of FIG. 1, according to non-limiting implementations.

Attention is next directed to FIG. 4 which depicts a schematic diagram of a device 107, which comprises: a processor 420; a memory 422; and a wireless communication interface 424 (interchangeably referred to hereafter as interface 424). Each of processor 420, memory 422 and wireless communication interface 424 is generally similar, respectively, to processor 220, memory 222 and interface 224, though adapted and/or selected and/or configured for use with device 107. Hence, interface 424 is generally configured to communicate wirelessly, and not in a wired manner. As depicted, device 107 further comprises a display device 426, at least one input device 428, an optional camera device 429, an optional speaker 432 and an optional microphone 434. While not depicted, device 107 further comprises a chassis and/or a housing, as well as a battery, a power pack and the like, which powers components of device 107 including, but not limited to, processor 420 and interface 424.

Programming instructions that implement the functional teachings of device 107 as described herein are typically maintained, persistently, in memory 422 and used by processor 420 which makes appropriate utilization of volatile storage during the execution of such programming instructions. Hence, memory 422 further stores an application 436 that, when executed by processor 420, enables processor 420 to: collect data broadcast by tags 103, when device 107 is proximal thereto; transmit the data to server 101 using links 111, 117 and network 109; and generally communicate with tags 103 and server 101, including transmitting data to tags 103 and/or server 101 thereto. As such interface 424 is generally configured to communicate both with tags 103 and with network 109; hence, interface 424 can comprise a short-range communication interface compatible with communicating with respective interfaces 324 of tags 103, when proximal thereto, and a longer-range communication interface compatible for communication with network 109 and/or interface 224 of server 101. The short-range communication interface can comprise one or more of radio devices compatible with one more of Bluetooth™ low energy tags, Bluetooth™ Smart tags, iBeacon™ tags, and the like; the long-range communication interface can comprise one or more radio devices compatible with network 109 and can be similar to interface 224 of server 101, described above.

While it has already been mentioned that database 250 can initially be blank and/or empty, once database 250 is populated, such that identifiers of tags 103 are associated with locations of tags 103, when device 107 receives one or more respective identifiers of adjacent tags 103 (e.g. neighbor data and/or nearest neighbor data), server 101 can determine a position of device 107 in space 105 by comparing the respective identifiers of the tags 103 adjacent device 107 (as received from device 107) with respective locations of the tags 103 in database 25.

Returning to FIG. 1, space 105 is indicated using broken lines to denote an area and/or space and/or location within which tags 103 are fixed and/or deployed, however space 105 can be larger than the area delineated by the broken lines. Space 105 can hence comprise at least a portion of a store, a warehouse, and the like, and/or any other space within which location tracking of device 107 is desired. Tags 103 are generally deployed and/or fixed at positions in space 105 using mounting apparatus 325 and/or external mounting apparatus; for example, when space 105 comprises a store and/or a warehouse, space 105 can comprise shelving units and/or rows of shelving units, and tags 103 can be fixed to the shelving units. However, tags 103 can also be fixed to ceilings, walls and/or any other feature and/or structural feature of space 105, presuming such features, themselves, are at fixed positions in space 105.

Furthermore, tags 103 can be fixed at positions in space 105 according to a broadcast range and/or broadcast strength and/or broadcast power level of tags 103. For example, as described above, a broadcast range of a tag 103 can be about 1 meter, or so, hence, tags 103 are deployed in space 105 at about twice the broadcast range, or a tag 103 at about every 2 meters, or a little less (e.g. a tag at about every 1.8 meters, or so), such that the broadcast ranges of neighboring tags 103 overlap and/or so that broadcast ranges of both first nearest neighbor tags and second nearest neighbor tags overlap.

For example, again referring to FIG. 1, and using tag T34 as an example, tags T24, T35, T44, T33 can each be spaced on locations of a grid at less than about twice the broadcast range of each of tags 103. Hence, tag 34 can receive data from each of tags T24, T35, T44, T33, and at about the same power level; similarly, each of tags T24, T35, T44, T33 can receive data from tag 34, at about the same power level, as each of tags T24, T35, T44, T33 are about equidistant from tag 34. Tags T24, T35, T44, T33 can also be referred to as first nearest neighbor tags (i.e. to tag T34) and/or as closest nearest neighbor tags (i.e. to tag T34).

However, tags T23, T25, T43, T45 are also neighbors of tag 34, but on a diagonal therefrom, as compared to locations of tags T24, T35, T44, T33. Tags T24, T35, T44, T33 can hence also be referred to as second nearest neighbor tags (i.e. to tag T34) and/or as second closest nearest neighbor tags (i.e. to tag T34).

However, in some implementations, tag 34 can receive further data from each of tags T23, T25, T43, T45, but at a lower power level lower than from tags T24, T35, T44, T33. Hence, tag 34 can determine that each of tags T24, T35, T44, T33 are closer thereto than tags T23, T25, T43, T45. Furthermore, tag 34 can receive the further data from each of tags T23, T25, T43, T45 at about the same (lower) power level; similarly, each of tags T23, T25, T43, T45 can receive data from tag 34, at about the same (lower) power level, as each of tags T23, T25, T43, T45 are also about equidistant from tag 34.

Figure 5:
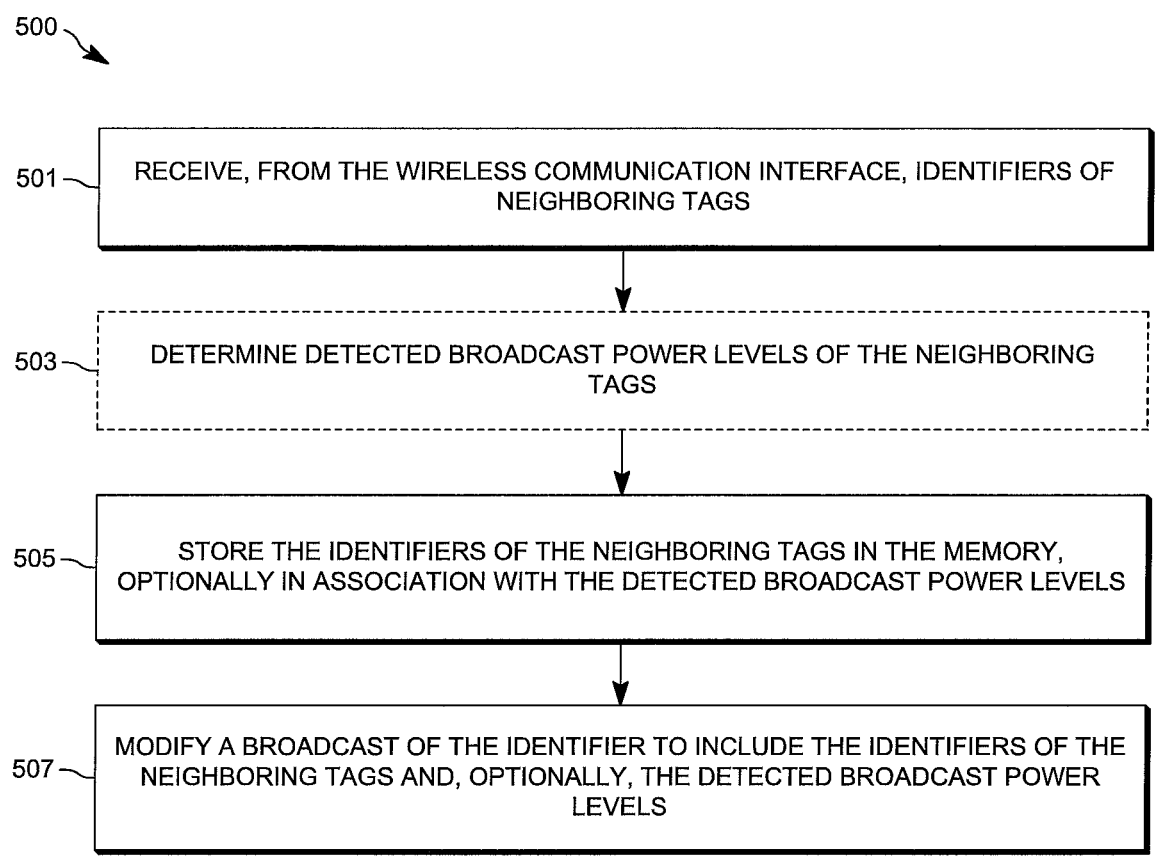
FIG. 5 depicts a block diagram of a flowchart of a method for initiating mapping of tag locations, at the tags of the system of FIG. 1, according to non-limiting implementations.

Attention is now directed to FIG. 5 which depicts a block diagram of a flowchart of a method 500 for initiating mapping of tag locations, according to non-limiting implementations. In order to assist in the explanation of method 500, it will be assumed that method 500 is performed using each of tags 103, and specifically by each processor 320 at each tag 103, when each processor 320 processes respective instructions stored at a respective memory 322, for example application 336. Indeed, method 500 is one way in which tags 103 can be configured. Furthermore, the following discussion of method 500 will lead to a further understanding of tags 103, and their various components. However, it is to be understood that each tag 103 and/or method 500 can be varied, and need not work exactly as discussed herein in conjunction with each other, and that such variations are within the scope of present implementations.

Regardless, it is to be emphasized, that method 500 need not be performed in the exact sequence as shown, unless otherwise indicated; and likewise various blocks may be performed in parallel rather than in sequence; hence the elements of method 500 are referred to herein as "blocks" rather than "steps". It is also to be understood, however, that method 500 can be implemented on variations of each tag 103 as well.

It is further assumed in method 500 that a tag 103 is configured as in FIG. 3, such that memory 322 stores a respective identifier "TRC", and interface 324 is configured to broadcast the respective identifier "TRC".

At block 501, processor 320 receives, from wireless communication interface 324, identifiers of neighboring tags 103.

At block 503, processor 320 can optionally determine detected broadcast power levels of the neighboring tags, presuming tag 103 is configured to do so. As block 503 is optional, block 503 is depicted in broken lines.

At block 505, processor 320 stores the identifiers of neighboring tags 103 in memory 322 in association with the detected broadcast power levels.

At block 507, processor 320 modifies the broadcast of the respective identifier "TRC" to include the identifiers of neighboring tags 103 and, optionally, the detected broadcast power levels (presuming that block 503 has been implemented).

As described above, device 107 can receive the data broadcast by tags 103, and transmit the data to server 101, which can determine respective locations therefrom.

Figure 6:
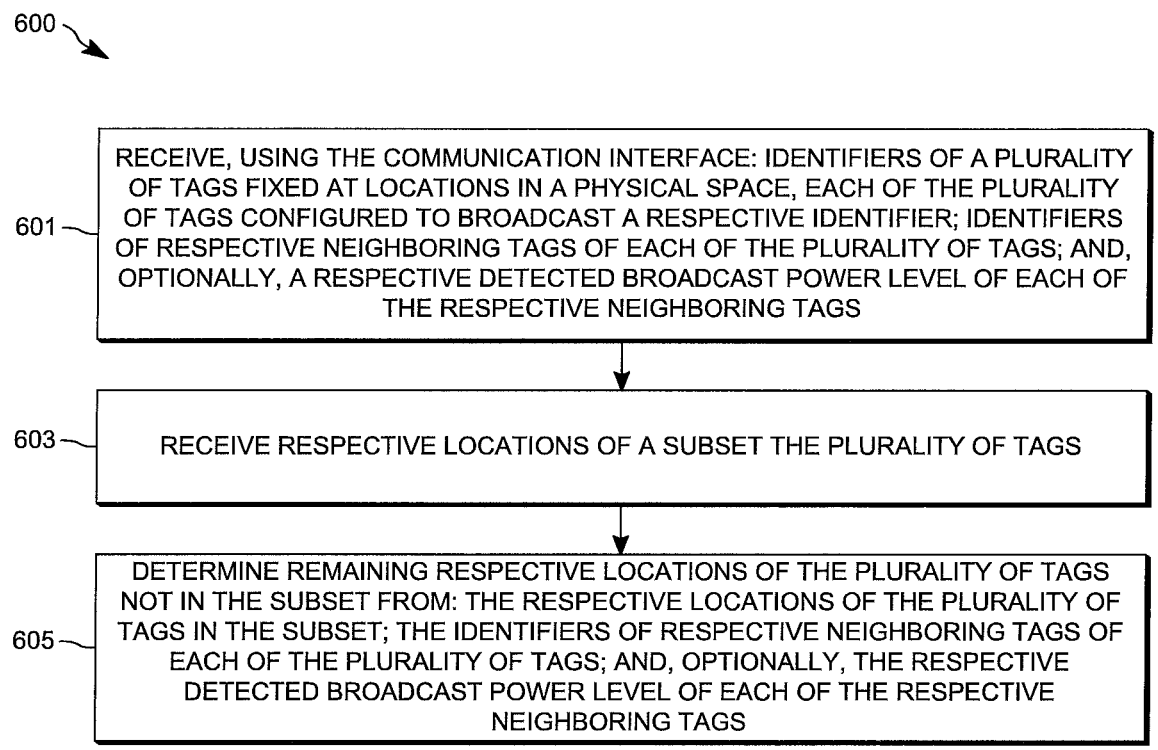
FIG. 6 depicts a block diagram of a flowchart of a method for determining tag locations, at the server of the system of FIG. 1, according to non-limiting implementations.

Hence, attention is next directed to FIG. 6 which depicts a block diagram of a flowchart of a method 600 for determining tag locations, according to non-limiting implementations. In order to assist in the explanation of method 600, it will be assumed that method 600 is performed using server, and specifically by processor 220 at server 101, when processor 220 processes instructions stored at memory 222, for example application 236. Indeed, method 600 is one way in which server 101 can be configured. Furthermore, the following discussion of method 600 will lead to a further understanding of server 101, and its various components. However, it is to be understood that server 101 and/or method 600 can be varied, and need not work exactly as discussed herein in conjunction with each other, and that such variations are within the scope of present implementations.

Regardless, it is to be emphasized, that method 600 need not be performed in the exact sequence as shown, unless otherwise indicated; and likewise various blocks may be performed in parallel rather than in sequence; hence the elements of method 600 are referred to herein as "blocks" rather than "steps". It is also to be understood, however, that method 600 can be implemented on variations of server 101 as well.

At block 601, processor 220 receives, using communication interface 224: identifiers of a plurality of tags 103 fixed at locations in a physical space 105, each of plurality of tags 103 configured to broadcast a respective identifier; identifiers of respective neighboring tags 103 of each of the plurality of tags 103; and, optionally, a respective detected broadcast power level of each of the respective neighboring tags 103 (presuming tags 103 are broadcasting a respective detected broadcast power level of each of the respective neighboring tags 103).

At block 603, processor 220 receives respective locations of a subset of the plurality of tags 103. In general, a number of the plurality of tags 103 in the subset is less than a total number of the plurality of tags 103.

At block 605, processor 220 determines remaining respective locations of the plurality of tags 103 not in the subset from: the respective locations of the plurality of tags in the subset; the identifiers of respective neighboring tags 103 of each of the plurality of tags 103; and, optionally, the respective detected broadcast power level of each of the respective neighboring tags 103.

Methods 500 and 600 will now be described with reference to FIG. 7 to FIG. 19.

Figure 7:
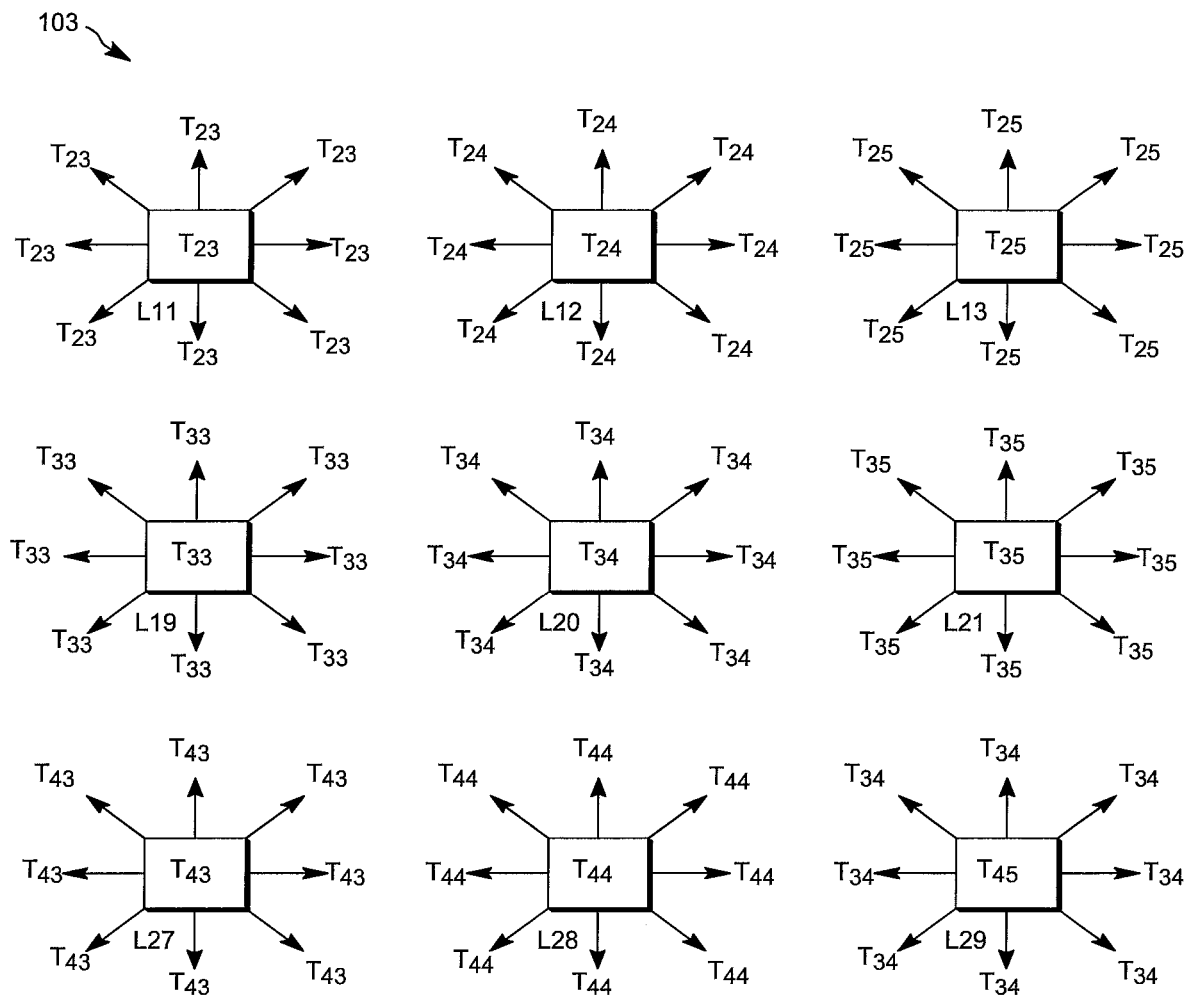
FIG. 7 depicts broadcast of respective tag identifiers at a subset of the tags of the system of FIG. 1, according to non-limiting implementations.

Attention is next directed to FIG. 7 which depicts a portion of plurality of tags 103 and specifically tags T23, T24, T25, T33, T34, T35, T43, T44, T45. While not all components of system 100 are depicted in FIG. 7 they are assumed to be nonetheless present. It is further assumed in FIG. 7 that each tag 103 is implementing method 500. Further, tag T34 is at the center of the depicted portion of tags 103, tags T24, T33, T35, T44 are nearest neighbors to tag T34, each at about a same first distance from tag T34, and tags T23, T25, T43, T45 are the second closest neighbors, each at about a same second distance from tag T34, the second distance being longer than the first distance.

Each of depicted tags 103 are further depicted as broadcasting a respective identifier "TRC" in all directions; for example, tag T34 is broadcasting identifier "T34". It is further assumed in FIG. 7 that each tag 103 (at block 501 of method 500) can receive data broadcast from both its nearest neighbors and its second nearest neighbors. Hence, for example, tag T34 can receive data from each of tags T23, T24, T25, T33, T35, T43, T44, T45, including their respective identifiers, and, optionally (at block 503 of method 500), determine a detected broadcast power level of each.

The detected broadcast power level is not the broadcast power level of a neighboring tag 103 and/or a broadcast power level stored in each respective set of configuration data 350 of each tag 103, but rather the broadcast power level of a broadcast of data of neighboring tag 103 as detected by a given tag 103.

For example, power level of such a broadcast will decrease a function of distance according to an inverse square law (e.g. by a factor of 1/r2, where "r" is a radial distance from a tag 103). Hence, with respect to tag T34, a detected broadcast power level of each of nearest neighbor tags 103 can be about a first detected broadcast power level "P1", and a detected broadcast power level of each of second nearest neighbors can be about a second detected broadcast power level "P2", wherein first detected broadcast power level "P1" is larger than second detected broadcast power level "P2". In some implementations, each detected broadcast power level P1, P2 can be expressed in terms of a numerical value corresponding to a power level value; however, in implementations where it is assumed that only two broadcast power levels will be detected, a first power level P1 corresponding to closest nearest neighbor tags 103, and a second power level corresponding to second closest nearest neighbor tags 103, each detected broadcast power level P1, P2 can be converted to an alphanumeric identifier indicating whether a detected broadcast power level is the first detected broadcast power level or the second detected broadcast power; in such implementations tag 103 can be configured to compare each detected broadcast power level from each neighboring tag 103 to one or more threshold values: for example, when a detected broadcast power level is above a threshold value it can be assumed that a neighboring tag 103 from which a respective identifier was received is a closest nearest neighbor tag, and when the detected broadcast power level is below the threshold value it can be assumed that the neighboring tag 103 from which the respective identifier was received is a second closest nearest neighbor tag.

In such implementations it is assumed that tags 103 are deployed in space 105 in a grid, as in FIG. 1. However, in other implementations, tags 103 can be deployed in other configurations and method 500 can be adapted accordingly, for example when identifiers of third closest nearest neighbors are also received at each tag 103.

Figure 8:
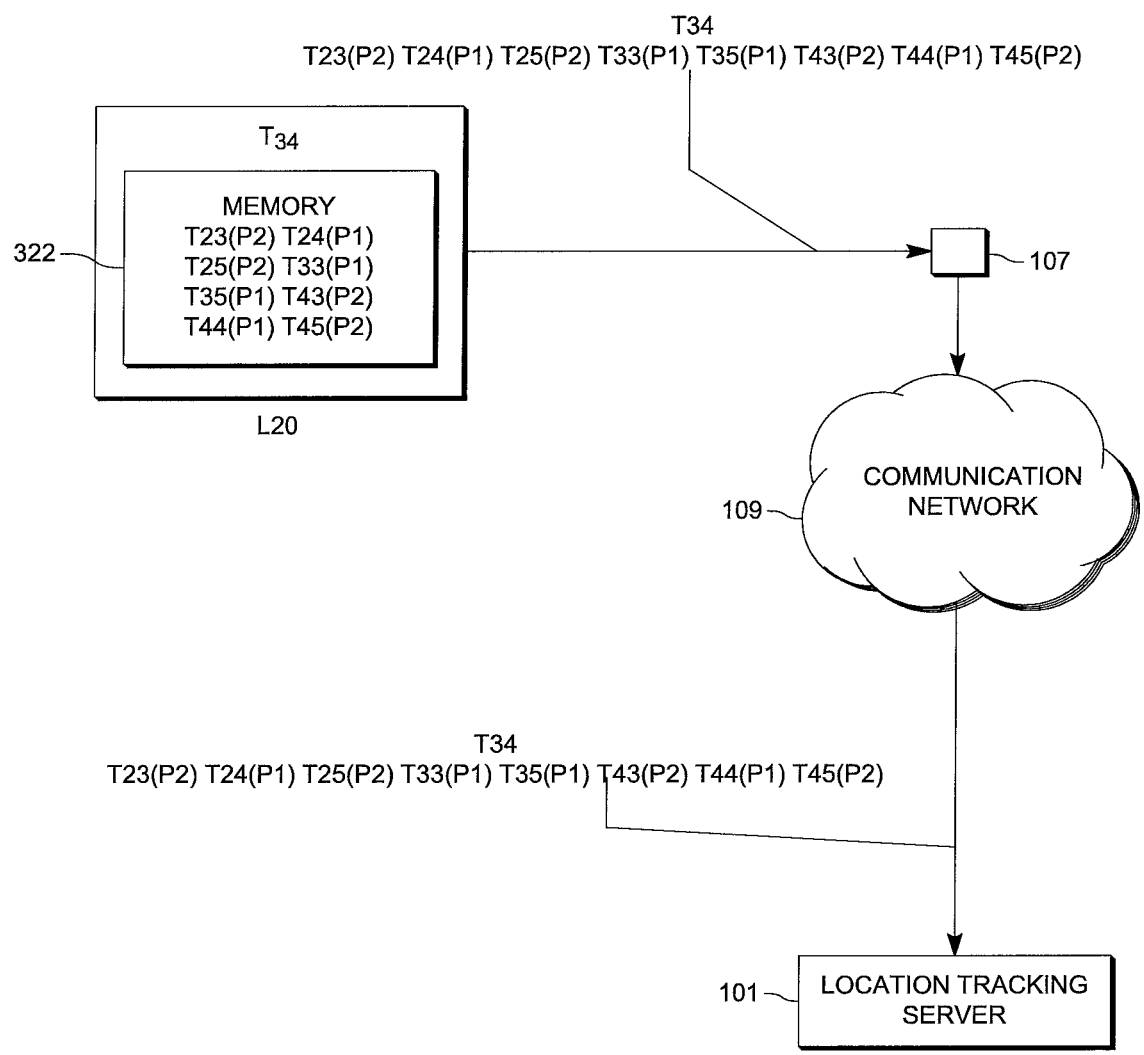
FIG. 8 depicts an interaction between a tag, the mobile device and the server of the system of FIG. 1, and specifically a broadcast of neighbor data by the tag, according to non-limiting implementations.

Attention is next directed to FIG. 8, which depicts details of system 100 and in particular an interaction between tag T34, device 107, and server 101. While not all components of system 100 are depicted in FIG. 8 they are assumed to be nonetheless present. Further, it is assumed in FIG. 8 that device 107 is proximal to tag T34; in other words, it is assumed in FIG. 8 that device 107 is within a broadcast range of tag T34 and can communicate with tag T34 using a short-range communication interface of interface 424.

It is further assumed in FIG. 8, that tag 34 has received identifiers TRC from each of its neighboring tags 103, and optionally determined broadcast power levels of each. As such, the respective identifiers of neighboring tags 103 are stored (at block 505 of method 500) in memory 322, optionally in association with their respective determined broadcast power levels P1, P2. Furthermore, a broadcast of respective identifier T34 has been modified (at block 507 of method 500) to include the respective identifiers of nearest neighbors and, optionally, their respective detected broadcast power levels. As such, in FIG. 8, tag T34 is depicted as broadcasting: tag identifier "T34" in a first format and/or on a first line, to indicate its own respective identifier; and neighbor data "T23 (P2) T24 (P1) T25(P2) T33(P1) T35(P1) T43(P2) T44(P1) T45(P2)" in a second format and/or on a second line, to indicate respective nearest neighbor identifiers and, optionally, detected broadcast power levels thereof. As indicated above, each of P1 and P2 can comprise a numeric value corresponding to a broadcast power level, or each of P1 and P2 can comprise an alphanumeric identifier indicating whether a respective identifier corresponds to a nearest neighbor or a second nearest neighbor. When block 503 of method 500 is not implemented, the detected broadcast power levels are not broadcast.

While the data broadcast by tag T34 is depicted as being broadcast in one direction (e.g. towards device 107), it is assumed that such a broadcast can occur in all directions as depicted in FIG. 7.

Device 107 receives the data broadcast by tag T34 and transmits the data to server 101 via network 109. Hence, server 101 and/or processor 220 is generally configured to receive the identifiers of the plurality of tags 103, and the respective identifiers of respective neighboring tags 103 of each of the plurality of tags 103 from a mobile device, such as device 107.

While device 107 is depicted as interacting with only one tag T34 in FIG. 8, as device 107 passes each of the plurality of tags 103, device 107 collects data from each tag 103 and transmits the data to server 101.

In some implementations, each tag 103 can stop broadcasting neighbor data relating to neighboring tags 103 once a handshake and/or confirmation from device 107 indicates that such neighbor data has been received at device 107 and/or that such neighbor data has been received at server 101. In the latter scenario, server 101 can transmit, to device 107, a confirmation that the neighbor data relating to neighboring tags 103 has been received, which in turn transmits, to a respective tag 103, a handshake and/or confirmation of same. In such implementations, each tag 103 then returns to broadcasting its respective identifier "TRC" without broadcasting its neighbor data.

In yet further implementations, each tag 103 can be further configured to collect nearest neighbor data broadcast by each of its neighboring tags 103 and, in turn, include, in its respective broadcast, such nearest neighbor data. In other words, with respect to FIG. 8, each neighbor tag 103 of tag T34 can receive the neighbor data broadcast by tag T34 and incorporate such data, in association with a respective identifier of tag T34, into its own broadcast. Similarly, tag T34 can incorporate nearest neighbor data, received from its nearest neighbor tags, into its own broadcast (each set of neighbor data identified by an associated tag identifier). In such implementations, device 107 can collect nearest neighbor data broadcast from only a subset of tags 103 as long as the nearest neighbor data collected includes nearest neighbor data for all tags 103; indeed, once neighbor data broadcast from each tag 103 has propagated to every other tag 103, each tag 103 can be broadcasting the same data which includes all nearest neighbor data for all of tags 103. Hence, device 107 need only collect broadcast data from one tag 103.

In such implementations, device 107 can transmit a handshake and/or confirmation to a proximal tag 103, which can transmit the handshake and/or confirmation to nearest neighbor tags which can, in turn, propagate the handshake and/or confirmation throughout the plurality of tags 103 to cause them to return a "normal" broadcast mode as depicted in FIG. 7.

In implementations where the neighbor data has not yet propagated to all tags 103, device 107 can continue to collect the broadcast data from proximal tags 103, even as the neighbor data propagates throughout the plurality of tags 103, until all data from all tags 103 are collected at server 101.

As will be described hereafter, server 101 and/or processor 220 can be generally configured to populate one or more of database 250 and a table stored at memory 222 with data associated with the plurality of tags 103, the data including the respective location of each of the plurality of tags 103 and the respective identifiers of respective neighboring tags 103 of each of the plurality of tags 103.

Attention is hence next directed to FIG. 9 which depicts a portion of database 250 once data from each of tags 103 has been collected at server 101 from device 107. In other words, it is assume in FIG. 9 that server 101 has, at block 601 of method 600, received receives, using the communication interface 224: identifiers of a plurality of tags 103 fixed at respective locations in physical space 105, each of the plurality of tags 103 configured to broadcast: a respective identifier; and respective identifiers of respective neighboring tags 103 of each of the plurality of tags. It is further assumed in FIG. 9 that the respective detected broadcast power level of each of the respective neighboring tags 103 received with the respective identifiers of respective neighboring tags of each of the plurality of tags 103 has also been received.

In particular, in FIG. 9, database 250 is depicted in a table format with identifiers of tags 103 indicated in a first column, with one identifier per row, a location of each respective tag 103 is indicated in a second column (all of which are initially unknown), and identifiers of nearest neighbors for each tag 103 are indicated in a third column. While rows are depicted for only a portion of tags 103, it is assumed that database 250 includes a row for each tag 103 from which a respective identifier was received.

Respective detected broadcast power levels of nearest neighbors are indicated according to the following format in the third column: nearest neighbors tag 103 having a detected broadcast power level of P1 are indicated by a respective identifier having the format "TRC"; and nearest neighbor tags 103 having a detected broadcast power level of P2 are indicated by a respective identifier having the format "TRC". Hence, using the row corresponding to tag T34 as an example, and with reference to FIG. 8, nearest neighbors in the third column are indicated using "T'23 T24 T'25 T33 T35 T'43 T44 T'45" indicating that, at tag T34, identifiers T24, T33, T35, T44 were received at a detected broadcast power level of P1, and identifiers T23, T25, T43, T45 were received at a detected broadcast power level of P2.

While FIG. 9 depicts particular formats for data stored in database 250, it is appreciated that the depicted formats are for provided for simplicity, and other formats of database 250 are within the scope of present implementations, for example any suitable database format.

Figure 10:
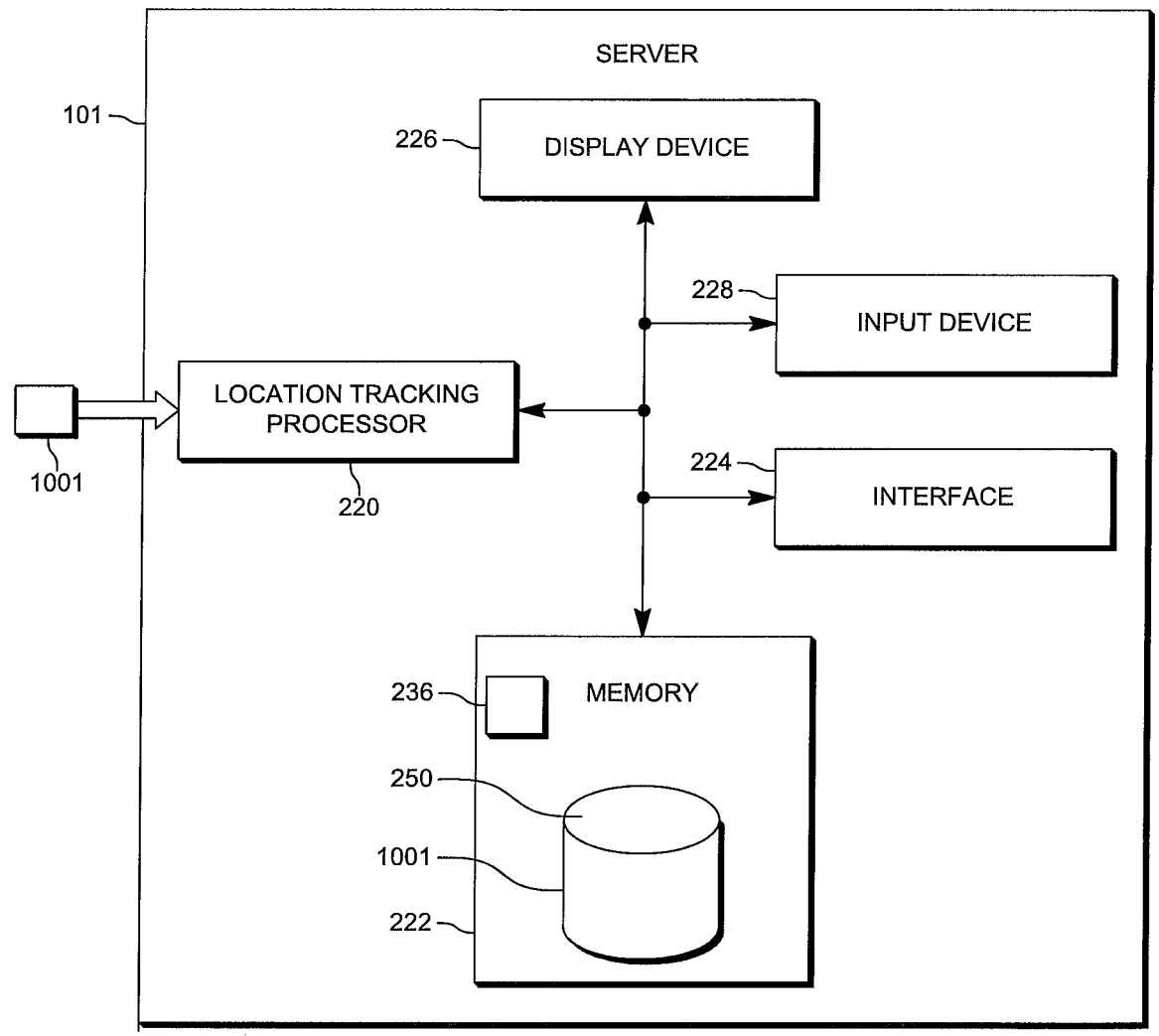
FIG. 10 depicts the server of the system of FIG. 1 receiving locations of a subset of the tags of the system of FIG. 1, to initiate determination of locations of a remainder the tags, according to non-limiting implementations.

Attention is next directed to FIG. 10, which is substantially similar to FIG. 2, with like elements having like numbers. In particular, FIG. 10 depicts an implementation of block 603 of method 600, in which processor 220 receives receive respective locations 1001 of a subset of plurality of tags 103, a number of the plurality of tags 103 in the subset being less than a total number of the plurality of tags 103. For example, locations 1001 can be received from input device 228 and/or interface 224 and/or network 109 and/or device 107. Either way, locations 1001 act as seeds for method 600, which uses locations of a subset of plurality of tags 103 to determine locations of other tags 103. As such, locations 1001 can be stored in memory 222, details of which are depicted in FIG. 12, described below.

Hence, in some implementations, an operator of server 101 can enter locations 1001 at input device 228 while, in other implementations, an operator or device 107 can enter locations 1001 at device 107 which, in turn, transmits locations 1001 to server 101. In yet further implementations, device 107 can comprise a GPS (Global Positioning System) apparatus and/or location sensing apparatus, which can collect approximate GPS coordinates, and/or location coordinates (and the like) of a tag 103 when a respective identifier thereof is received, and transmit the GPS coordinates to server 101. However, such an implementation could be combined with user confirmation of such coordinates in the event that a plurality of respective identifiers of tags 103 are received at the same position of device 107 when device 107 is within a broadcast range of more than one tag 103; in these implementations device 107 can be configured to instruct a user to hold device 107 adjacent a tag 103, and confirm an identifier of the adjacent tag 103, such that GPS coordinates of device 107, when adjacent the tag 103, can be associated with the confirmed identifier and transmitted to server 101 (e.g. the identifier and any neighboring tag data).

Locations 1001 can comprise one or more of GPS (global positioning system) coordinates; absolute location data; and relative location data, the relative location data being relative to a given position in physical space 105. For example, in the relative location data, the a location in physical space 105 can be designated as an origin position (e.g. (0,0)) and the remaining locations being defined relative to the origin position.

Method 600 can be implemented according to various modes of operation at server 101, depending on whether map 251 is stored at memory 222, whether detected broadcast power levels are received, a type of data in locations 1001, and a number of tag locations received in locations 1001. For example, server 101 and/or processor 220 can be further configured to determine (e.g. at block 605 of method 600) the remaining respective physical locations of plurality of tags 103 that are not in the subset indicated by locations 1001 using one or more of: an intersection operation; and triangulation based on a respective detected broadcast power level of each of the respective neighboring tags 103 received with the respective identifiers of respective neighboring tags of each of the plurality of tags. Such modes of operation will be described hereafter.

A first mode of operation will now be described, assuming that map 251 is stored in memory 222. Attention is hence next directed to FIG. 11, which depicts a non-limiting implementation of map 251 indicating that space 105 comprises a plurality of zones L1, L2, ... L40, arranged in a grid. In particular, in these implementations, it is assumed that one tag 103 will be deployed per zone, and that the zones are about equal in size.

With such a map 251, locations of tags 103 can be determined (e.g. at block 605 of method 600) with respect to the zones without reference to the detected broadcast power levels. As depicted, each of zones L1, L2, ... L40 can be identified by an alphanumeric name, however, alternatively, each zones L1, L2, ... L40 can be identified by one or more of GPS (global positioning system) coordinates; absolute location data (e.g. latitude/longitude and the like); and relative location data, the relative location data being relative to a given position in physical space 105.

For example, attention is next directed to FIG. 12, which depicts database 250 after locations 1001 are received. In particular, locations 1001 comprise respective alphanumeric identifiers of zones of each of tags T24, T33, T34, T35 and T44. For example, as depicted in FIG. 13, which provides a graphic indication of locations of tags T24, T33, T34, T35 and T44 on map 251, tag T24 is located in zone L12, tag T33 is located in zone L19, tag T34 is located in zone L20, tag T35 is located in zone L21, and tag T28 is located in zone L28. From such data, locations of neighboring tags 103 can be determined (e.g. at block 605 of method 600) using an intersection operation and map 251.

For example, from an intersection of respective identifiers of neighboring tags of tags T24, T33 and T34 (e.g. which can be expressed mathematically as N(T24)∩N(T33)∩N(T34), where "N" indicates the set of neighbor tag identifiers stored in database 250 for each of tags 24, T33, T34) it can be determined that tag T23 is a neighbor to each of tags T24, T33 and T34: specifically, the identifier "T23" appears in nearest neighbor data for each of tags T24, T33 and T34, hence tag T23 is a neighbor of each of tags T24, T33 and T34.

As only zone L11 in map 251, as depicted in FIG. 13, matches such criteria (i.e. only zone L11 is neighbor to each of zones L12, L19, L20 in which tags T24, T33 and T34 are respectively located, it can be determined that tag T23 is located in zone L11.

A similar intersection operation can occur for each of the neighbor data sets for the remaining tags 103 in subset specified by locations 1001, to determine that tag T25 is located in zone L13 (e.g. N(T25)∩N(T34)∩N(T35)), tag T43 is located in zone L27 (e.g. N(T33)∩N(T34)∩N(T44)), and tag T45 is located in zone 29 (e.g. N(T34)∩N(T35)∩N(T44)). Database 250 can be populated as in FIG. 14 to indicate locations of each of tags T23, T25, T43, T45, which is also depicted graphically on map 251 in FIG. 15.

Furthermore, processor 220 can use a trial-and-error approach to determining intersections of neighbor data sets of tags 103 for which locations are received in locations 1001: when three neighbor data sets yield an intersection, processor 220 can determine that the tag TRC in the intersection is a neighbor of all three tags 103 and assign a location accordingly using map 251.

Hence, FIG. 14 and FIG. 15 further show that locations of remaining neighboring tags 103 can be determined (e.g. at block 605 of method 600) using an intersection operation when locations 1001 include locations of at least three neighboring tags 103 to a tag 103 whose location is initially unknown. For example, if locations 1001 contained only locations of tags T23, T33, T24, a location of tag T23 could be determined, but locations of the remaining tags 103 could not be determined using an intersection operation alone. Hence, when an intersection operation alone is used to determine locations of remaining tags 103 (for which locations are not initially known), locations 1001 are selected to reflect the geometry of tags 103 in space 105. In a grid format, as depicted in FIG. 1, location 1001 can include locations of one central tag, for example tag T34, and each of its closest nearest neighbors, for example tags T24, T33, T35, T44. Locations of the remaining tags 103 can be determined, propagating outwards from the tags 103 whose locations were received in locations 1001. However, in other geometries, locations 1001 can include locations of other numbers of tags 103 and/or other combinations of locations of tags 103.

The process described with reference FIG. 12 to FIG. 15 can be repeated iteratively until locations of all tags 103 are determined (e.g. at block 605 of method 600).

For example, attention is directed to FIG. 16 and FIG. 17, which are respectively similar to FIG. 14 and FIG. 15; however in FIG. 16 and FIG. 17, respective locations L18, L22 of tags T32, T36 have also been determined using respective intersection operations of data in database 250 depicted in FIG. 14, the respective intersection operations expressed mathematically as: N(T23)∩N(T33)∩N(T43) and N(T25)∩N(T35)∩N(T35); while not depicted in FIG. 14 (as the data for tags T14, T54 are not depicted in FIG. 14), respective locations L4, L36 of tags T14, T54 can also be determined using intersection operations of data from database 250 depicted in FIG. 14, the respective intersection operations expressed mathematically as: N(T23)∩N(T24)∩N(T25) and N(T43)∩N(T44)∩N(T45).

Such intersection operations again show that neighbor data from three adjacent tags 103 can be used to determine a location of neighboring tags 103. Using the intersection operation of N(T23)∩N(T33)∩N(T43) as an example, it is appreciated that tag 34 is another possible result of the intersection operation; however, as a location of tag 34 has already been determined, tag 34 is excluded from the results.

In any event, this process continues until all locations in the second column of database 250 are populated. Hence, when device 107 later transmits a tag identifier, an associated location of the tag identifier can be determined from database 250, and server 101 can determine that device 107 is proximal the associated location.

In any event, in the mode of operation described with reference to FIG. 11 to FIG. 17, memory 222 stores a map 251 of zones of physical space 105, the respective locations of a subset the plurality of tags 103, received in locations 1001, each comprising a respective zone, processor 220 being configured to: determine that each of the zones comprises one of the plurality of tags 103; and, determine remaining respective locations of the plurality of tags 103 not in the subset from intersections of the respective identifiers of the respective neighboring tags 103 of the tags 103 in the subset and map 251.

In another mode of operation, processor 220 can further use (e.g. at block 605 of method 600) the respective detected broadcast power level of each neighboring tag 103 identified in the third column of database 250 to determine whether a determined location of a neighboring tag 103 is a closest nearest neighbor tag or a second closest nearest neighbor tag to validate the intersection operation.

For example, again with reference to FIG. 14 and FIG. 15, processor 220 can determine that tag T23 is located at location L11, which indicates that tag T23 is a closest nearest neighbor to tags T24, T33, and a second closest nearest neighbor T34; the respective detected broadcast power level of tag T23 in each of the data sets of tags T24, T33, T34 validate such a determination as, in the nearest neighbor identifiers of tags T24, T33 tag T23 is identified as "T23" (e.g. a received power of P1 and/or a first closest nearest neighbor), while in the nearest neighbor identifiers of tag T34 tag T23 is identified as "T'23" (e.g. a received power of P2 and/or a second closest nearest neighbor).

Indeed, in some of these implementations, for example where server 101 and/or processor 220 receives detected broadcast power levels P1, P2 in a format that corresponds to an absolute power, server 101 and/or processor 220 can be further configured to determine (e.g. at block 605 of method 600) a distance between neighboring tags 103 based on a respective detected broadcast power level, of each of the respective neighboring tags 103, received with the respective identifiers of respective neighboring tags 103 of each of the plurality of tags 103. For example, when locations 1001 include locations of a subset of tags 103 which can be converted to absolute distances (such as meters, centimeters, and the like), an absolute distance between a first set of two of tags 103 can be determined from locations 1001; then, using the inverse square law, a distance between remaining tags 103 can be determined from a respective detected broadcast power level between pairs of the remaining tags 103, and the respective detected broadcast power level between the tags 103 in the first set. Again, these distances can be used to validate database 250, and/or convert each location L1, L2 . . . L40 to a location defined with respect to a distance and/or a distance in a coordinate system using distances between tags 103 and map 251.

In any event, in yet a further mode of operation, when the respective detected broadcast power levels are received at server 101, server 101 and/or processor 220 can use triangulation techniques (e.g. at block 605 of method 600) to determine respective locations of the plurality of tags 103 not in the subset of tags 103 defined by locations 1001, based on a respective detected broadcast power level of each of the respective neighboring tags 103 received with the respective identifiers of respective neighboring tags 103 of each of the plurality of tags 103. Such a mode of operation is not reliant on map 251 which can be absent from memory 222 in such implementations.

Figure 18:
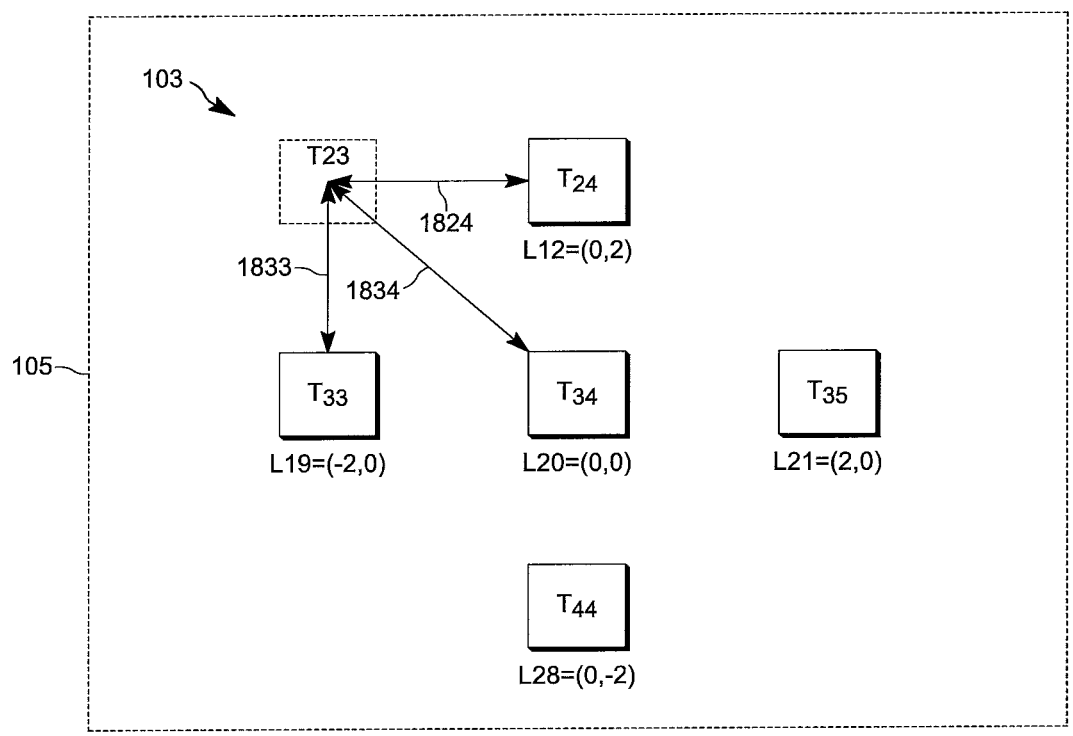
FIG. 18 depicts a triangulation operation used in determining tag locations, according to non-limiting implementations.

For example, attention is directed to FIG. 18 which depicts a subset of tags 103 and their positions in space 105, the positions determined from locations 1001. For example, in these implementations, locations 1001 can comprise a respective location of each of tags T24, T33, T34, T35, T44 defined in distances: as depicted, the distances are relative to an origin position of (0,0) which has arbitrarily assigned to tag T34, with each of tags 103 assumed to be on a 2 meter grid, such that a tag 103 is located every 2 meters in space 105; as such, a location of tag 24 can be expressed using coordinates (0,2) indicating tag 24 is the same column as tag 34, but located 2 meters away from tag 34; locations of tags T33, T35, T44 are also expressed in a similar manner with regards to a coordinate system. Alphanumeric location identifiers L12, L19, L20, L21, L28 are depicted in FIG. 18 merely to cross-reference with FIG. 1, but each location need not be identified using such alphanumeric identifiers.

Using the intersection operation described above, server 101 and/or processor 220 can determine that tag T23 is a neighbor of each of tags T24, T33, T34; using the respective detected broadcast power levels of tag T23 as determined by each of tags T24, T33, T34, server 101 and/or processor 220 can determine that tag T23 is a closest nearest neighbor of each of tags T24, T33, and a second closest nearest neighbor of tag T34. Server 101 and/or processor 220 can further determine a distance between tag T23 and each of tags T24, T33, T34 from the respective detected broadcast power levels, as described above. As there is no directionality in the respective detected broadcast power levels, a triangulation operation can be used to determine a position of tag T23, which is depicted in broken lines in FIG. 18 to indicate that its location is not initially known.

For example, also depicted in FIG. 18 is a respective radial distance from each of tags T24, T33, T34, as represented by arrows 1824, 1833, 1834, respectively, each of arrows 1824, 1833, 1834 representing a radius of a respective circle centered on each of tags T24, T33, T34, such circles (not depicted), representing possible locations of tag 23 relative to each of tags T24, T33, T34, based on each respective detected broadcast power level. The intersection of arrows 1824, 1833, 1834 represent a triangulation of the respective detected broadcast power level for each of tags T24, T33, T34 and hence the location of tag T23. The determined location (e.g. a location (−2, 2) of tag T23) can be populated at database 250. Locations of the remaining tags can be populated at database 250 in a similar manner.

Indeed, attention is next directed to FIG. 19 which depicts database 250 partially populated according to some modes of operation of system 100 that use triangulation, after a location of tag T23 has been determined. As depicted, locations of each of tags T24, T33, T34, T35 are populated using data received in locations 1001, and a location of tag T23 has been populated using an intersection operation and a triangulation operation. The locations of the remaining tags 103 can be populated at database 250 iteratively, as described above.

Hence, in modes of operation that include triangulation, server 101 and/or processor 220 can be configured to, when at least three of the tags 103 in the subset (for which locations are received in locations 1001) are neighbors, determine common neighboring tags 103 of the least three of the tags 103 using an intersection of the respective identifiers of the respective neighboring tags 103 of the least three of the tags 103, the common neighboring tags 103 not in the subset; and, determine the remaining respective physical locations of the common neighboring tags 103 from a respective detected broadcast power level, of each of the common neighboring tags 103 associated with each of the at least three of the tags 103, received with the respective identifiers of respective neighboring tags 103 of each of the plurality of tags 103. Such a determination of the remaining respective physical locations of the common neighboring tags 103 can include triangulation techniques, as described above.

Indeed, in such implementations, server 101 and/or processor 220 can be configured to iteratively: determine common neighboring tags 103 of the plurality of tags 103 for which the respective physical locations have been previously determined; and determine the remaining respective physical locations of the common neighboring tags 103 from a respective detected broadcast power level of each of the common neighboring tags 103 associated with each of the plurality of tags 103 for which the respective physical locations have been previously determined, the respective detected broadcast power level received with the respective identifiers of respective neighboring tags 103 of each of the plurality of tags 103. Such a determination of the remaining respective physical locations can include triangulation techniques, as described above.

Furthermore, when locations of tags 103 change (for example when space 105 is reconfigured), methods 500, 600 can be repeated to determine their new locations. For example, when methods 500, 600 have been implemented and database 250 has been populated, and thereafter the locations of tags 103 change, device 107 and/or server 101 (e.g. via device 107), can transmit a command to a closest tag 103 to again begin implementing method 500, and the closest tag 103 can again implement method 500 and further broadcast transmit a command to nearest neighbor tags 103 to again implement method 500. Such a command to again implement method 500 can be triggered manually and/or automatically, presuming that system 100 is generally configured to sense when space 105 is reconfigured (e.g. system 100 can include sensors that can detect when shelving units to which tags 103 are fixed are moved, and communicate such a change to device 107 and/or server 101.

In the foregoing specification, specific implementations have been described. However, various modifications and changes will occur to persons skilled in the art; for example communications between tags 103, device 107 and server 101 can be encrypted to prevent other devices from intercepting such communications and using such communications maliciously. Any suitable encryption/decryption scheme is within the scope of present implementations, and each of processors 220, 320, 420 can be adapted accordingly.

Yet further implementations are within the scope of present implementations; for example, while present implementations have been described with reference to each tag 103 broadcast identifier "TRC", in other implementations, each tag 103 can broadcast a respective second identifier 337, or both identifier "TRC" and a respective second identifier 337. Put another way each tag 103 can be configured to broadcast one or more of identifier "TRC" and a respective second identifier 337, and furthermore, database 250 can be populated with one or more of identifier "TRC" and a respective second identifier 337, for each tag 103.

Furthermore, while tags 103 have been described with respect to broadcasting identifiers, other data could be broadcast including, but not limited to, one or more of a configuration identifier (which identifies configuration data stored at a tag 103), configuration data parameters, such as a major number and/or a minor number, and/or configuration data.

In some implementations, once database 250 is populated (or at least after tag identifiers have been determined and stored at database 250), configuration data 350 at each tag 103 can be updated and/or changed, for example to change one or more of: a rate of broadcast, a broadcast power level, identifier "TRC", a major number (when present), a minor numbers (when present) and/or any other parameter of configuration data 350.

Figure 20:
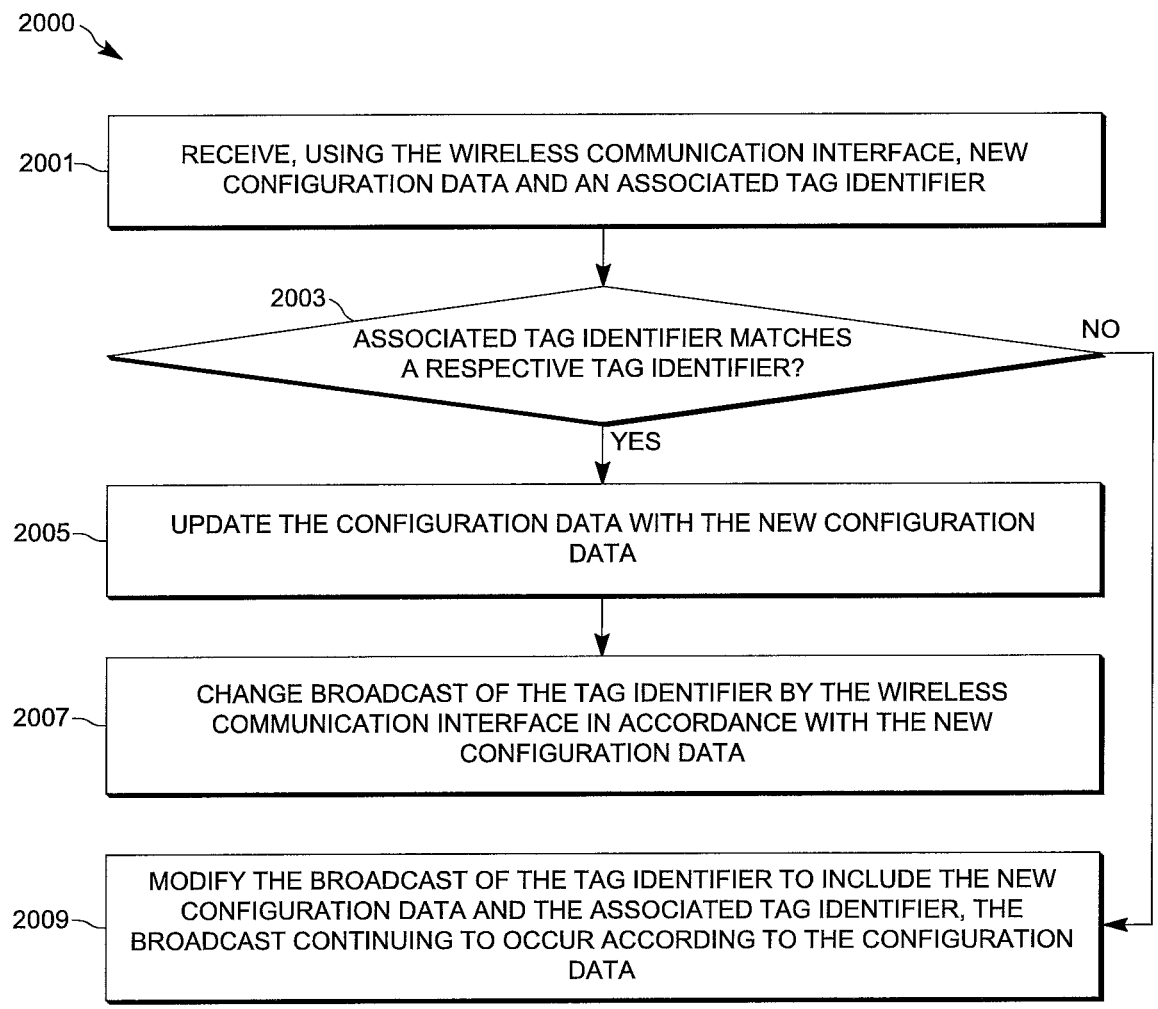
FIG. 20 depicts a block diagram of a flowchart of a method for updating configuration data at a tag, at the server of the system of FIG. 1, according to non-limiting implementations.

Hence, attention is now directed to FIG. 20 which depicts a block diagram of a flowchart of a method 2000 for updating configuration data at a tag, according to non-limiting implementations. In order to assist in the explanation of method 2000, it will be assumed that method 2000 is performed using each of tags 103, and specifically by each processor 320 at each tag 103, when each processor 320 processes respective instructions stored at a respective memory 322, for example application 336. Indeed, method 2000 is one way in which tags 103 can be configured. Furthermore, the following discussion of method 2000 will lead to a further understanding of tags 103, and their various components. However, it is to be understood that each tag 103 and/or method 2000 can be varied, and need not work exactly as discussed herein in conjunction with each other, and that such variations are within the scope of present implementations.

Regardless, it is to be emphasized, that method 2000 need not be performed in the exact sequence as shown, unless otherwise indicated; and likewise various blocks may be performed in parallel rather than in sequence; hence the elements of method 2000 are referred to herein as "blocks" rather than "steps". It is also to be understood, however, that method 2000 can be implemented on variations of each tag 103 as well.

It is further assumed in method 2000 that a tag 103 is configured as in FIG. 3, such that: memory 322 stores a respective tag identifier, which could be identifier "TRC" and/or second identifier 337, and configuration data 350; and wireless communication interface 324 is configured to broadcast a respective tag identifier according to configuration data 350. In other words, configuration data 350 can define a rate of broadcast, a power of broadcast, and the like and interface 324 functions accordingly under control of processor 320.

At block 2001, processor 320 receives, using wireless communication interface 324, new configuration data and an associated tag identifier.

At block 2003, processor 320 determines whether associated tag identifier, received with the new configuration data, matches the respective tag identifier stored in memory 322.

When the associated tag identifier matches the respective tag identifier (e.g. a "Yes" decision at block 2003): at block 2005, processor 320 updates configuration data 350 with the new configuration data; and, at block 2007, processor 320 changes the broadcast of the respective tag identifier by wireless communication interface 324 in accordance with the new configuration data.

However, when the associated tag identifier does not match the respective tag identifier (e.g. a "No" decision at block 2003): processor 320 modifies the broadcast of the respective tag identifier to include the new configuration data and the associated tag identifier, the broadcast continuing to occur according to configuration data 350.

In this manner, the new configuration data can be propagated through system 100 until a tag 103 having the associated tag identifier receives the new configuration, and reconfigures itself accordingly.

Method 2000 will next be described with reference to FIG. 21 to FIG. 26.

Figure 21:
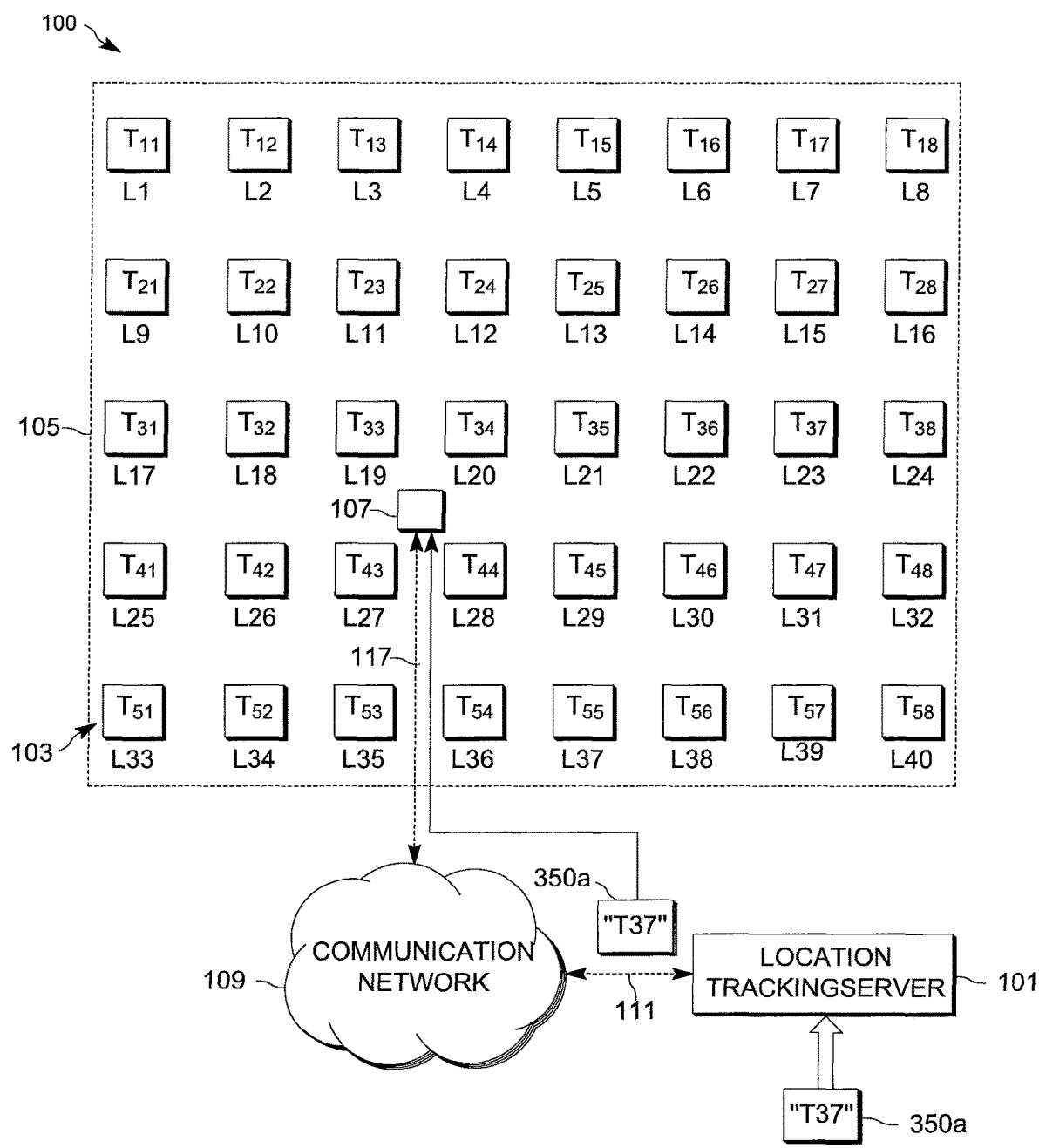
FIG. 21 depicts new configuration data being propagated from the server to the mobile device of the system of FIG. 1, according to non-limiting implementations.

Attention is next directed to FIG. 21, which is substantially similar to FIG. 1, with like elements having like numbers; however, it is assumed in FIG. 21 that a database of tag identifiers (which can include, but is not limited to, database 250), stored at server 101, has been at least populated with tag identifiers "TRC" and/or second identifiers 337 of each tag 103 using methods 500, 600 and/or any other method for populating a database of tag identifiers (and optionally locations) including, but not limited to, manual methods. In other words, while method 2000 can be performed in conjunction with methods 500, 600, method 2000 can also be performed independent of methods 500, 600. Furthermore, while a database of tag identifiers at server 101 can include locations of each tag 103, tag locations need not be populated for method 2000 to be implemented.

In any event, it is further assumed in FIG. 21 that respective configuration data 350 at tag T37 is to be updated and/or changed. In some implementations, as depicted, server 101 can receive new configuration data 350a in association with a tag identifier "T37" of tag T37. While present implementations are described with respect to tag identifiers TRC being used to identify which tag 103 is to be updated with new configuration data, in other implementations a respective second identifier 337 can be used to identify which tag 103 is to be updated with new configuration data.

New configuration data 350a and tag identifier "T37" (or an identifier of any tag 103 that is to be updated with new configuration data 350a) can be received at server 101 using input device 228, and/or interface 224: in other words, new configuration data 350a and tag identifier "T37" can be received at server 101 via manual input at server 101 and/or via a message and/or network communication.

New configuration data 350a can define new parameters on how a tag (that is to be updated with new configuration data 350a) is to behave. For example, new configuration data 350a can define one or more of an updated broadcast rate, an updated broadcast power level, an updated identifier "TRC", an updated major number (and the like), an updated minor number (and the like), and/or any other parameter stored in existing configuration data and/or any other parameter that can be added to existing configuration data (e.g. major/minor numbers, and the like, can be added after locations are determined and/or after locations of tags 103 change.

Furthermore, while method 2000 is described with reference to updating configuration data at one tag 103, method 2000 could be repeated with a plurality of new configuration data intended for different tags 103 (as indicated by associated tag identifiers), and hence functioning of a plurality of tags 103 can be reconfigured using method 2000. For example, in implementations where major numbers and minor numbers are used to designate regions of space 105, major numbers and minor numbers could be reconfigured at a subset of tags 103 and/or for all of tags 103 to implement a reorganization of space 105

In any event, server 101 transmits new configuration data 350a and associated tag identifier "T37" to device 107 using network 109. Device 107 receives new configuration data 350a and associated tag identifier "T37" using interface 324.

Figure 22:
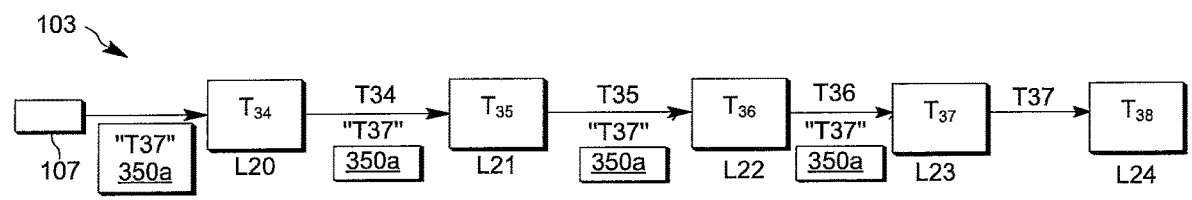
FIG. 22 depicts new configuration data being propagated from the mobile device to the tags of the system of FIG. 1, according to non-limiting implementations.

Attention is next directed to FIG. 22, which depicts a portion of system 100, including device 107 and tags T34, T35, T36, T37, T38, though other components of system 100 are assumed to be present. Once device 107 receives new configuration data 350a and associated tag identifier "T37", device 107 transmits new configuration data 350a and associated tag identifier "T37" to any tags 103 that are proximal to device 107 (e.g. any tag 103 that is within range of the short-range communication interface at device 107). In FIG. 22, only tag T34 is depicted as being proximal to device 107, and hence tag T34 receives (e.g. at block 2001 of method 2000) new configuration data 350a and associated tag identifier "T37"; however, with reference to FIG. 21, tags T33, T43, T44 could also receive new configuration data 350a and associated tag identifier "T37".

Returning to FIG. 22, respective processor 320 at tag T34 compares (e.g. at block 2003 of method 2000) associated tag identifier "T37" with tag identifier T34 stored in respective memory 322. As they do not match (e.g. "T37" does not match "T34"), respective processor 320 at tag T34 modifies (e.g. at block 2009 of method 2000) the broadcast of respective tag identifier T34 to include new configuration data 350*a* and associated tag identifier "T37", the broadcast at tag T34 continuing to occur according to configuration data 350 stored at respective memory 322.

Tags 103 that are nearest neighbors to tag T34 receive the data broadcast by tag T34, for example as described above with respect to FIG. 7 and FIG. 8. As depicted in FIG. 22, such a nearest neighbor includes tag T35, which repeats the process of comparing (e.g. at block 2003 of method 2000) associated tag identifier "T37" with tag identifier T35 stored in respective memory 322. As the identifiers do not match, respective processor 320 at tag T35 modifies (e.g. at block 2009 of method 2000) the broadcast of respective tag identifier T35 to include new configuration data 350*a* and associated tag identifier "T37", the broadcast at tag T35 continuing to occur according to configuration data 350 stored at respective memory 322 at tag T35. The process is again repeated at each adjacent tag until a tag 103 adjacent tag T37 modifies its respective broadcasts to include new configuration data 350*a* and associated tag identifier "T37", which are then received at tag T37. For example, as depicted, tag T37 receives (e.g. at block 2001), using a respective wireless interface 324 at tag T37, new configuration data 350*a* and associated tag identifier "T37".

Respective processor 320 at tag T37 then determines (e.g. at block 2003 of method 2000) that associated tag identifier "T37" matches a respective tag identifier "T37"). Hence, respective processor 320 at tag T37 implements blocks 2005, 2007 such that configuration data 350 stored at respective memory 322 at tag T37 is updated with new configuration data 350*a*, and tag T37 broadcasts respective tag identifier "T37" according to new configuration data 350*a* (e.g. to change a rate of broadcast, a broadcast power level, or other parameters). In some implementations, updating configuration data 350 with new configuration data 350*a* comprises updating parameters in configuration data 350 to match corresponding parameters in new configuration data 350*a* (i.e. the updated configuration data matches new configuration data 350*a*); in other implementations, updating configuration data 350 with new configuration data 350*a* comprises replacing configuration data 350 with new configuration data 350*a*. Either way, configuration data stored at tag T37 comprises new configuration data 350*a*.

In some implementations, tag identifier "T37" can be changed to a new tag identifier stored in new configuration data 350*a* when the configuration data at tag T37 is updated; in these implementations, the new tag identifier is also updated at the database of tag identifiers at server 101, for example when server 101 transmits new configuration data 350*a* and associated tag identifier "T37" to device 107. However, in other implementations, tag T37 (as identified by the new tag identifier) can broadcast a confirmation that its identifier has changed, which can be propagated through tags 103 to device 107 and transmitted to server 101; once server 101 receives the confirmation (which can include, but is not limited to, the old tag identifier "T37" and the new tag identifier) the database of tag identifiers at server 101 can be updated with the new tag identifier.

Figure 23:
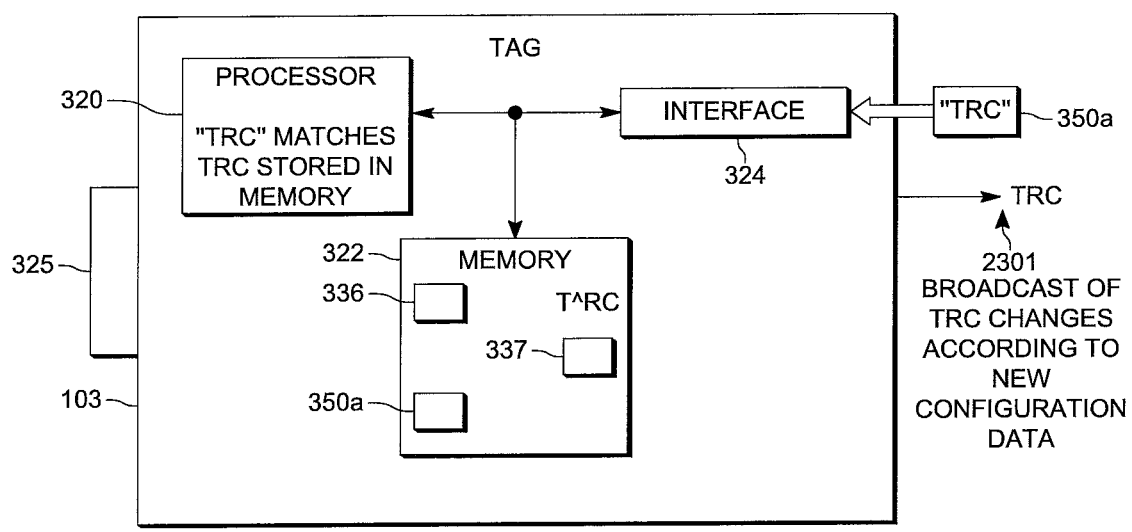
FIG. 23 depicts an aspect of the method of FIG. 20, when a new configuration data is received at a tag, the new configuration data for updating the configuration data of the tag, according to non-limiting implementations.

Attention is next directed to FIG. 23, which is substantially similar to FIG. 3, with like elements having like numbers, FIG. 23 depicting blocks 2001 to 2007 being implemented at a tag 103. It is assumed in FIG. 23 that the tag identifier received with new configuration data 350*a* matches the tag identifier "TRC" stored in memory 322. In particular, FIG. 23 depicts new configuration data 350*a* and an associated tag identifier "TRC" being received at tag 103 using interface 224 (e.g. at block 2001 of method 2000). Processor 320 compares associated tag identifier "TRC" with tag identifier "TRC" stored at memory 322 and determines that they match (e.g. at block 2003 of method 2000); and, as they match, configuration data 350 is updated (e.g. at block 2005 of method 2000) with new configuration data 350*a*, for example by replacing configuration data 350 with new configuration data 350*a*. Broadcast 2301 of tag identifier "TRC" is changed (e.g. at block 2007 of method 2000) according to new configuration data 350*a*, for example to change a broadcast rate, a broadcast power level, data broadcast with tag identifier "TRC", and the like. Hence, tag 103 is reconfigured according to new configuration data 350*a*.

Figure 24:
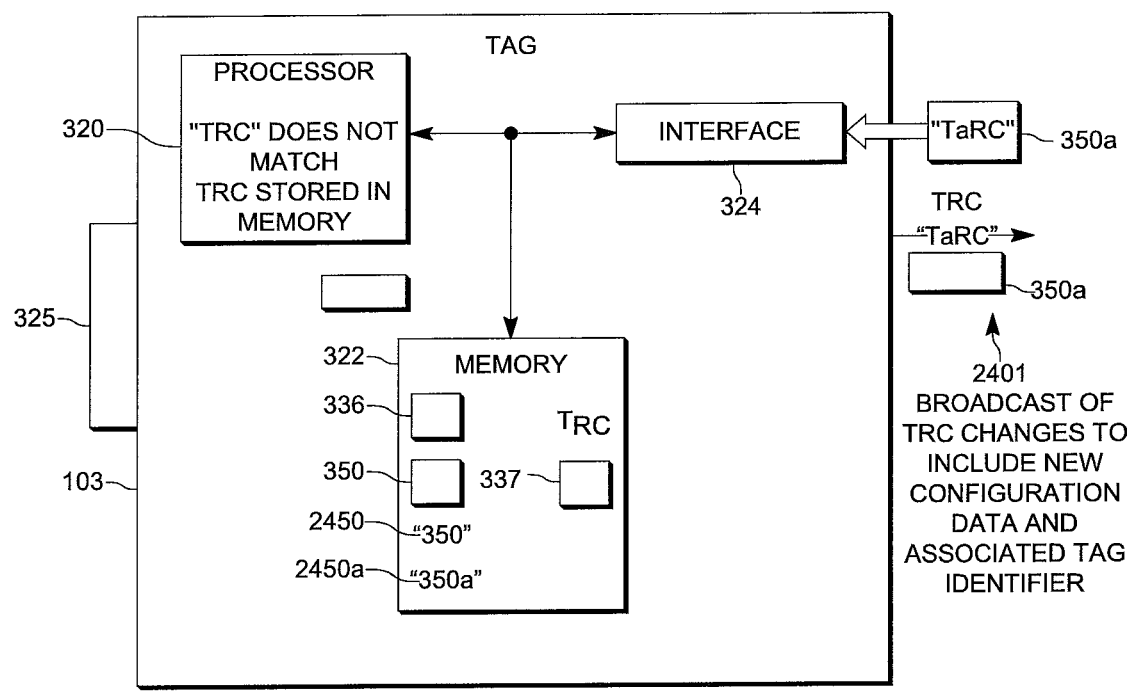
FIG. 24 depicts another aspect of the method of FIG. 20, when a new configuration data is received at a tag, the new configuration data not for updating the configuration data of the tag, according to non-limiting implementations.

Attention is next directed to FIG. 24, which is substantially similar to FIG. 3, with like elements having like numbers, FIG. 24 depicting blocks 2001, 2003 and 2009 being implemented at a tag 103. It is assumed in FIG. 24 that the tag identifier received with new configuration data 350*a* does not match the tag identifier "TRC" stored in memory 322. In particular, FIG. 24 depicts new configuration data 350*a* and an associated tag identifier "TaRC" being received at tag 103 using interface 224 (e.g. at block 2001 of method 2000). Processor 320 compares associated tag identifier "TaRC" with tag identifier "TRC" stored at memory 322 and determines that they do not match (e.g. at block 2003 of method 2000); and, as they do not match, broadcast 2401 of tag identifier "TRC" is changed (e.g. at block 2009 of method 2000) to include new configuration data 350*a* and associated tag identifier "TaRC", for example to change a broadcast rate, broadcast 2401 continuing to occur according to configuration data 350. Hence, tag 103 receives new configuration data 350*a* and, as new configuration data 350*a* is not intended for tag 103, tag 103 includes new configuration data 350*a* and associated tag identifier "TaRC" in its broadcast 2401, such that new configuration data 350*a* can be transmitted from tag 103 to tag 103 until new configuration data 350*a* is received at a tag 103 having an associated tag identifier "TaRC".

With continued reference to FIG. 24, broadcast 2401 of respective tag identifier "TRC" can be modified to include new configuration data 350*a* and associated tag identifier "TaRC" by one or more of: broadcasting new configuration data 350*a* and associated tag identifier "TaRC" once; broadcasting new configuration data 350*a* and associated tag identifier "TaRC" a given number of times; and, broadcasting new configuration data 350*a* and associated tag identifier "TaRC" for a given time period. In other words, after new configuration data 350*a* and associated tag identifier "TaRC" is broadcast once, for a given number of times and/or for a given time period, broadcast 2401 is again modified so as to no longer include new configuration data 350*a* and associated tag identifier "TaRC".

In FIG. 24, memory 322 is further depicted as storing a configuration identifier 2450 identifying configuration data 350, or "350", and further storing configuration identifier 2450*a* identifying new configuration data 350*a*, or "350*a*". In other words, configuration data described herein can be generally identified using a configuration identifier which can comprise a parameter of the configuration data, which can be stored in the configuration data (when the configuration data is also stored in memory 322) and/or which can be extracted from the configuration data and stored in memory 322 and/or, can be received with configuration data and stored in memory 322.

Figure 25:
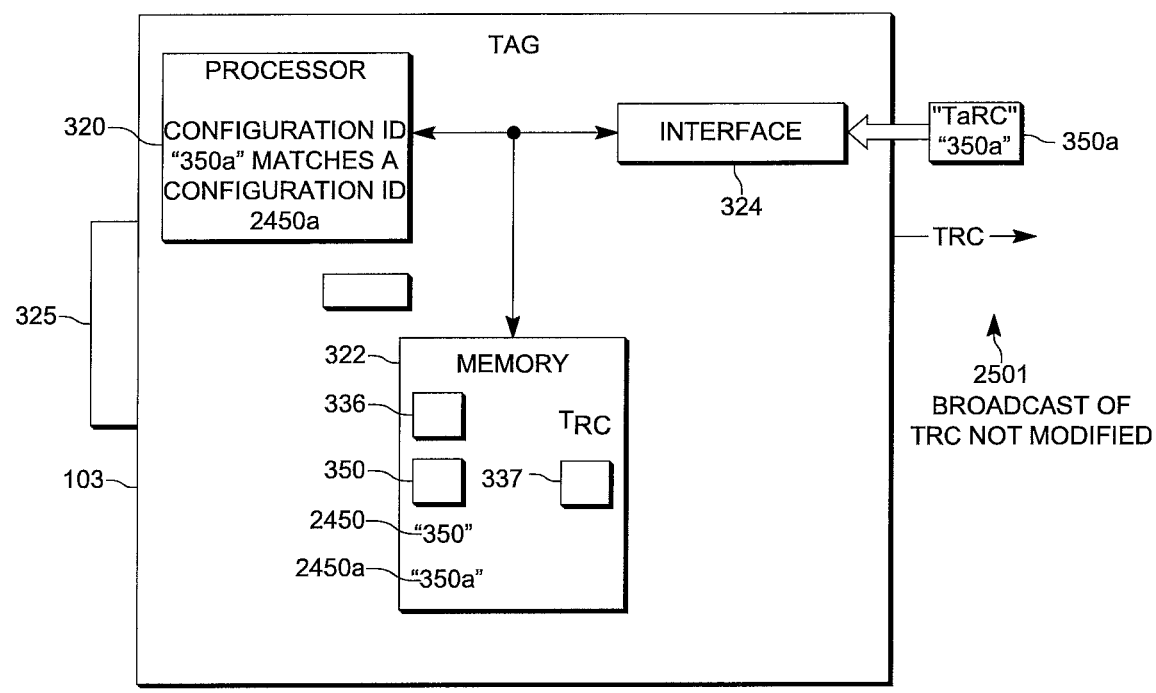
FIG. 25 depicts behavior of a tag when a new configuration data is received that is the same as previously received configuration data, according to non-limiting implementations.

Attention is next directed to FIG. 25, which is substantially similar to FIG. 24, with like elements having like numbers. However, in FIG. 25, it is assumed that new configuration data 350*a* has been previously received and configuration identifier 2450a (and configuration identifier 2450) is already stored in memory 322. Furthermore, in FIG. 25, further new configuration data 350a is received with a respective associated tag identifier "TaRC". In particular, each of the further new configuration data 350a is received with a respective associated tag identifier "TaRC" are the same as new configuration data 350a and the associated tag identifier "TaRC" previously received, as described with reference to FIG. 24. For example, such a situation can occur when new configuration data 350a and associated tag identifier "TaRC" are received at tag 103 from a plurality of neighboring tags 103 (i.e. as each of tags 103 that receive new configuration data 350a and associated tag identifier "TaRC" broadcast new configuration data 350a and associated tag identifier "TaRC" to neighboring tags 103, the tag 103 depicted in FIG. 24 and FIG. 25 can receive new configuration data 350a and associated tag identifier "TaRC" from different neighboring tags 103 at different times).

Processor 320 compares a configuration identifier "350a" of the further new configuration data 350a received therewith (e.g. as a parameter thereof, though depicted as being received at interface 324 separate from further new configuration data 350a for clarity) with configuration identifiers 2450, 2450a stored in memory 322. When the further new configuration data 350a, received at interface 324 is also identified by configuration identifier 2450a, of new configuration data 350a, stored in memory 322, processor 320 does not modify broadcast 2501 of respective tag identifier "TRC" regardless of whether the respective associated tag identifier "TaRC" matches or does not match the respective tag identifier "TRC".

In other words, the process described with reference to FIG. 25 reduces redundant broadcasting of new configuration data 350a from tag 103 to tag 103 when new configuration data 350a has been previously broadcast by a given tag 103.

Indeed, a given tag 103 can receive a plurality of configuration data, for example each intended for different tags 103, and broadcast the plurality of configuration data when not intended for the given tag 103. As each of the plurality of configuration data is received, the given tag 103 and/or a respective processor 320 thereof, stores, in a respective memory 322, respective configuration identifiers of the plurality of configuration data: with reference to FIG. 25, configuration identifiers 2450, 2450a stored in memory 322 are non-limiting examples of configuration identifiers of previously received configuration data. Hence, when new configuration data 350a is identified by any of the respective configuration identifiers 2450, 2450a stored in memory 322, processor 320 does not modify the broadcast of the respective tag identifier "TRC" regardless of whether the respective associated tag identifier "TaRC" matches or does not match the respective tag identifier "TRC" stored in memory 322.

In some of these implementations, each tag 103 can be configured to store a given number of configuration identifiers in a respective memory 322, for example the last "N" number of configuration identifiers received, where "N" is an integer number configurable at each tag 103, for example in configuration data 350 and/or in application 336. When "N" configuration identifiers are stored (i.e. a number of a plurality of configuration data previously received at a tag 103 is at least "N"), when new configuration data, identifier by a new configuration identifier, is received, the oldest configuration identifier stored in memory 322 is deleted and the new configuration identifier is added to memory 322 to keep the total number of configuration identifiers stored in memory 322 at "N".

In some further implementations, wireless communication interface 324 at each tag 103 can be further configured to broadcast the respective tag identifier "TRC" and a configuration identifier identifying respective configuration data of the tag 103. With reference to method 2000, the configuration identifier broadcast with the respective tag identifier "TRC" identifies either new configuration data 350a, when the associated tag identifier matches the respective tag identifier (e.g. a "Yes" decision at block 2003 of method 2000), or he configuration identifier broadcast with the respective tag identifier "TRC" identifiers configuration data 350, when the associated tag identifier does not match the respective tag identifier (e.g. a "No" decision at block 2003 of method 2000).

Figure 26:
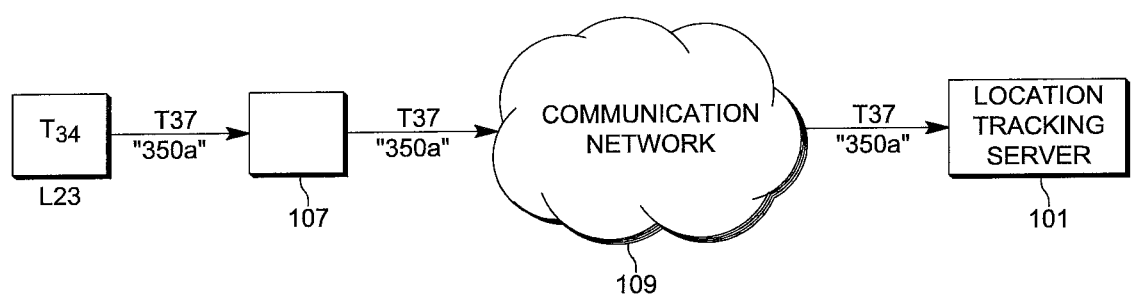
FIG. 26 depicts an interaction between a tag, the mobile device and the server of the system of FIG. 1, and specifically a broadcast of a configuration identifier by the tag, according to non-limiting implementations.

For example, attention is next directed to FIG. 26, which depicts details of system 100 and in particular an interaction between tag T37, device 107, and server 101. While not all components of system 100 are depicted in FIG. 26 they are assumed to be nonetheless present. Further, it is assumed in FIG. 26 that device 107 is proximal to tag T37; in other words, it is assumed in FIG. 26 that device 107 is within a broadcast range of tag T37 and can communicate with tag T37 using a short-range communication interface of interface 424. It is further assumed in FIG. 26 that tag T37 has been updated with new configuration data 350a and is further broadcasting a configuration identifier "350a" in the broadcast of tag identifier "T37" thereof.

Device 107 receives tag identifier "T37" and configuration identifier "350a"; and device 107, in turn, transmits receives tag identifier "T37" and configuration identifier "350a" to server 101 which stores receives tag identifier "T37" and configuration identifier "350a" in respective memory 222. As such, server 101 can track which configuration data is stored at tag T37. Indeed, in general, wireless communication interface 324 at each tag 103 can be further configured to broadcast a respective tag identifier and a configuration identifier identifying respective configuration data of tag 103, regardless of whether the associated configuration data was updated. However, in some implementations, wireless communication interface 324 at each tag 103 can be further configured to broadcast a respective tag identifier and a configuration identifier identifying respective configuration data of tag 103 to a mobile device, such as device 107, for example, when requested by device 107. Either way, device 107 can transmit a tag identifier and an associated configuration identifier, received from a tag 103, to server 101, such that server 101 can track which configuration data is stored at each tag 103.

In some of these implementations, each tag 103 can stop broadcasting a respective configuration identifier after a confirmation of receipt is received from one or more of device 107 and server 101.

Described herein are systems and methods of deploying tags in a physical space and, in particular, location tracking tags, including systems and methods of determining locations of the tags and updating configuration data at the tags. As each tag deployed in the space can broadcast data and receive data from neighboring tags, data can be transmitted from tag to tag in the physical space. Indeed, in some implementations the tags described herein can comprise a mesh network, which can interact with a mobile device moving proximal to the tags in the mesh network. Data from the tags can be broadcast to the mobile device when proximal thereto, and data can be received at the tags from the mobile device when proximal thereto. Such functionality is used herein to determine locations of tags, based on data received at each tag from nearest neighbor tags, as well as to deploy configuration data to a specific tag.

In the foregoing specification, specific implementations have been described. However, one of ordinary skill in the art appreciates that various modifications and changes can be made without departing from the scope of the specification as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, language of "at least one of X, Y, and Z" and "one or more of X, Y and Z" can be construed as X only, Y only, Z only, or any combination of two or more items X, Y, and Z (e.g., XYZ, XY, XZ, YZ, and the like). Similar logic can be applied for two or more items in any occurrence of "at least one . . . " and "one or more . . . " language.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting implementation the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some implementations may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an implementation can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus the following claims are hereby incorporated into the Detailed Description, with each claim standing on its own as a separately claimed subject matter.

We claim:
1. A tag having a fixed physical location comprising:
a processor;
memory storing a first identifier; and
a wireless communication interface configured to broadcast a first transmission including the first identifier, the processor configured to:
  receive, via the wireless communication interface, a second identifier of a neighboring tag;
  receive, via the wireless communication interface, a third identifier of a second neighboring tag;
  store the second identifier of the neighboring tag in the memory;
  store the third identifier of the second neighboring tag in the memory; and
  modify the first transmission including the first identifier to include the second identifier of the neighboring tag and the third identifier of the second neighboring tag; wherein the wireless communication interface is configured to broadcast the modified first transmission including the second identifier of the neighboring tag.
2. The tag of claim 1, wherein the processor is further configured to determine detected broadcast power level of the neighboring tag and modify the first transmission including the first identifier to include the detected broadcast power level.

3. The tag of claim 2, wherein the detected broadcast power level is the power level that a second transmission is broadcast from the neighboring tag.

4. The tag of claim 2, wherein the detected broadcast power level is the power level as received, at the wireless communication interface, of a second transmission broadcast from the neighboring tag.

5. The tag of claim 1, wherein the processor is further configured to:
determine a broadcast power level of the neighboring tag;
store the second identifier of the neighboring tag in the memory in association with the broadcast power level; and
modify the first transmission including the first identifier to include the detected broadcast power level.

6. The tag of claim 1, wherein the tag is one or more of a location tracking tag, a BLE (Bluetooth™ low energy) tag, a Bluetooth™ Smart tag, and an iBeacon™ tag.

7. The tag of claim 1, wherein the second identifier of the neighboring tag is indicative of a physical location of the neighboring tag.

8. A method comprising:
broadcasting, via a wireless communication interface of a tag, a first transmission including a first identifier of the tag;
receiving, via the wireless communication interface, a second transmission of a second identifier from a neighboring tag and a power level associated with a broadcast from the neighboring tag;
receiving, via the wireless communication interface, a third transmission of third identifier from a second neighboring tag and a second power level associated with a broadcast from the second neighboring tag;
storing, in memory of the tag, the second identifier of the neighboring tag and the third identifier of the second neighboring tag;
modifying, via a processor of the tag, the first transmission to include the second identifier and the third identifier; and
broadcasting, via the wireless communication interface of the tag, the modified first transmission including the first identifier, the second identifier of the neighboring tag, the power level associated with the broadcast from the neighboring tag, the third identifier of the second neighboring tag, and the second power level associated with the broadcast from the second neighboring tag.

9. The method of claim 8, wherein the power level is the power level at which the second transmission is broadcast from the neighboring tag.

10. The method of claim 8, wherein the second identifier of the neighboring tag is a MAC address.

11. A tag having a fixed physical location comprising:
a processor;
memory storing a first identifier; and
a wireless communication interface configured to broadcast the first identifier, the processor configured to:
receive, via the wireless communication interface, a second identifier of a neighboring tag and a third identifier of a second neighboring tag;
store the second identifier of the neighboring tag and the third identifier of the second neighboring tag in the memory;
modify the broadcast of the first identifier to include the second identifier of the neighboring tag and the third identifier of the second neighboring tag; and
cause the wireless communication interface to broadcast the first identifier and the second identifier of the neighboring tag.

12. The tag of claim 1, wherein the second identifier of the neighboring tag is a MAC address.

13. The tag of claim 11, wherein the second identifier of the neighboring tag is a MAC address.

* * * * *